United States Patent
Slob et al.

(10) Patent No.: US 11,536,314 B2
(45) Date of Patent: Dec. 27, 2022

(54) SLEW BEARING, METHOD FOR USING A SLEW BEARING, HOISTING CRANE AND VESSEL

(71) Applicant: ITREC B.V., Schiedam (NL)

(72) Inventors: Wouter Johannes Slob, Schiedam (NL); Joop Roodenburg, Schiedam (NL); Hendrikus Jacobus Weterings, Schiedam (NL)

(73) Assignee: ITREC B.V., Schiedam (NL)

( * ) Notice: Subject to any disclaimer, the term of this patent is extended or adjusted under 35 U.S.C. 154(b) by 357 days.

(21) Appl. No.: 16/636,187

(22) PCT Filed: Aug. 3, 2018

(86) PCT No.: PCT/NL2018/050534
§ 371 (c)(1),
(2) Date: Feb. 3, 2020

(87) PCT Pub. No.: WO2019/027325
PCT Pub. Date: Feb. 7, 2019

(65) Prior Publication Data
US 2020/0173492 A1  Jun. 4, 2020

(30) Foreign Application Priority Data

Aug. 4, 2017 (NL) .................................... 2019393
Oct. 12, 2017 (NL) .................................... 2019721
Oct. 18, 2017 (NL) .................................... 2019761

(51) Int. Cl.
*F16C 21/00* (2006.01)
*F16C 33/60* (2006.01)
(Continued)

(52) U.S. Cl.
CPC ............. *F16C 19/305* (2013.01); *B66C 23/16* (2013.01); *B66C 23/52* (2013.01); *B66C 23/62* (2013.01);
(Continued)

(58) Field of Classification Search
CPC ...... F16C 19/305; F16C 21/00; F16C 33/585; F16C 33/60; F16C 43/06; F16C 2300/14;
(Continued)

(56) References Cited

U.S. PATENT DOCUMENTS 4,622,860 A    11/1986  Cametti et al.
4,906,112 A    3/1990  Gobel et al.
(Continued)

FOREIGN PATENT DOCUMENTS

DE    20 2007 002 609 U1    4/2008
DE       202007002609 U1 *  5/2008  ............. F03D 80/70
(Continued)

OTHER PUBLICATIONS

International Search Report, issued in PCT/NL2018/050534, dated Nov. 29, 2018.
(Continued)

*Primary Examiner* — Phillip A Johnson
(74) *Attorney, Agent, or Firm* — Birch, Stewart, Kolasch & Birch, LLP

(57) ABSTRACT

A slew bearing includes a stationary bearing ring to be fixed to a base, and a moveable bearing ring to be fixed to a moveable object, wherein the stationary bearing ring and the moveable bearing ring are configured to enable rotation of the moveable bearing ring relative to the stationary bearing ring about a rotation axis. A main axial bearing and an auxiliary bearing are provided between the stationary bearing ring and the moveable bearing ring, wherein the moveable bearing ring includes one or more main portions and (Continued)

one or more auxiliary portions, which one or more main portions are moveable relative to the one or more auxiliary portions between an operational position, in which the main axial bearing transfers the axial loads between moveable bearing ring and stationary bearing ring, and a raised maintenance position, in which the auxiliary axial bearing transfers the axial loads between moveable bearing ring and stationary bearing ring and the main bearing is allowed to be inspected and/or maintained so that the slew bearing during inspection and/or maintenance is still operational.

23 Claims, 21 Drawing Sheets

(51) Int. Cl.
*F16C 19/30* (2006.01)
*B66C 23/16* (2006.01)
*B66C 23/52* (2006.01)
*B66C 23/62* (2006.01)
*F16C 33/58* (2006.01)

(52) U.S. Cl.
CPC ............ *F16C 21/00* (2013.01); *F16C 33/585* (2013.01); *F16C 33/60* (2013.01); *B66C 2700/0321* (2013.01); *F16C 2300/14* (2013.01); *F16C 2326/30* (2013.01)

(58) Field of Classification Search
CPC ......... B66C 23/16; B66C 23/52; B66C 23/62; B66C 2700/0321
See application file for complete search history.

(56) References Cited

U.S. PATENT DOCUMENTS

| | | | |
|---|---|---|---|
| 7,419,064 B2 * | 9/2008 | Miyazaki | ............... F16C 35/067 384/593 |
| 10,451,106 B2 | 10/2019 | Sauter | |
| 2014/0334752 A1 | 11/2014 | Weckbecker et al. | |
| 2017/0082141 A1 * | 3/2017 | Mtauweg | ................ F03B 11/06 |
| 2018/0209477 A1 * | 7/2018 | Sauter | ..................... F16C 33/60 |

FOREIGN PATENT DOCUMENTS

| | | |
|---|---|---|
| DE | 10 2011 083 824 A1 | 4/2013 |
| DE | 20 2015 006 588 U1 | 12/2016 |
| EP | 1 889 779 A1 | 2/2008 |
| EP | 2 092 204 A1 | 8/2009 |
| FR | 2 621 366 A1 | 4/1989 |
| FR | 2 749 358 A1 | 12/1997 |
| FR | 2749357 A1 * 12/1997 | ............ F16C 19/381 |
| JP | H08259178 A * 10/1996 | |
| WO | WO 2008/058729 A1 | 5/2008 |
| WO | WO 2015/088332 A1 | 6/2015 |
| WO | WO 2017/045734 A1 | 3/2017 |

OTHER PUBLICATIONS

Written Opinion of the International Searching Authority, issued in PCT/NL2018/050534, dated Nov. 29, 2018.

* cited by examiner

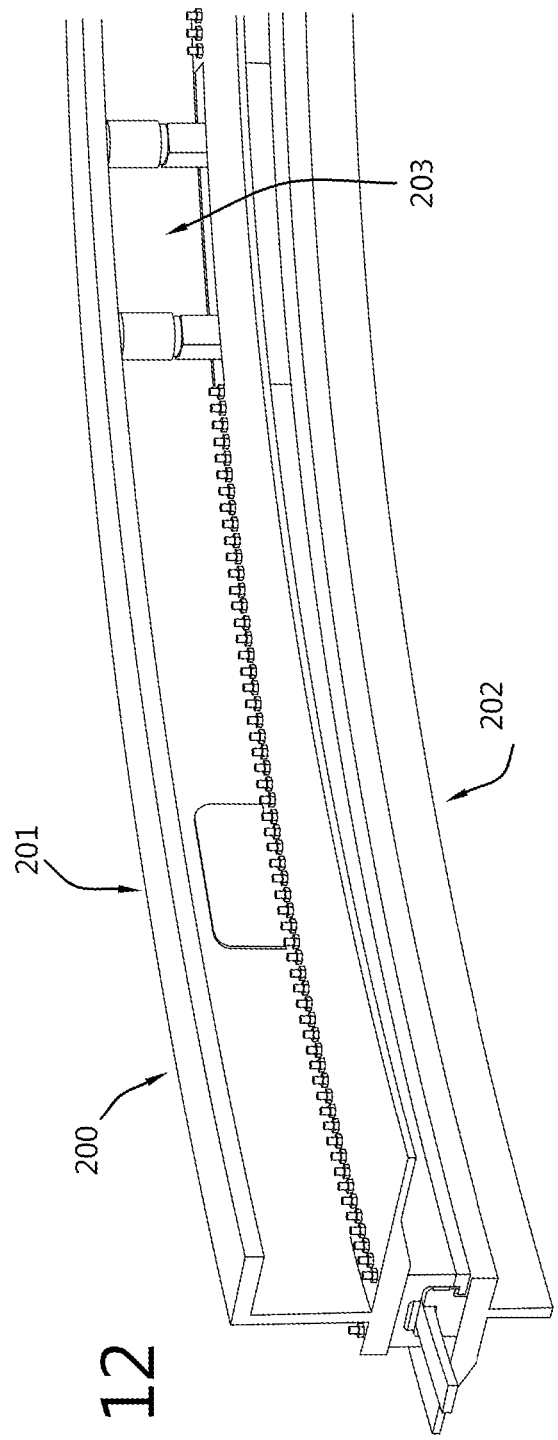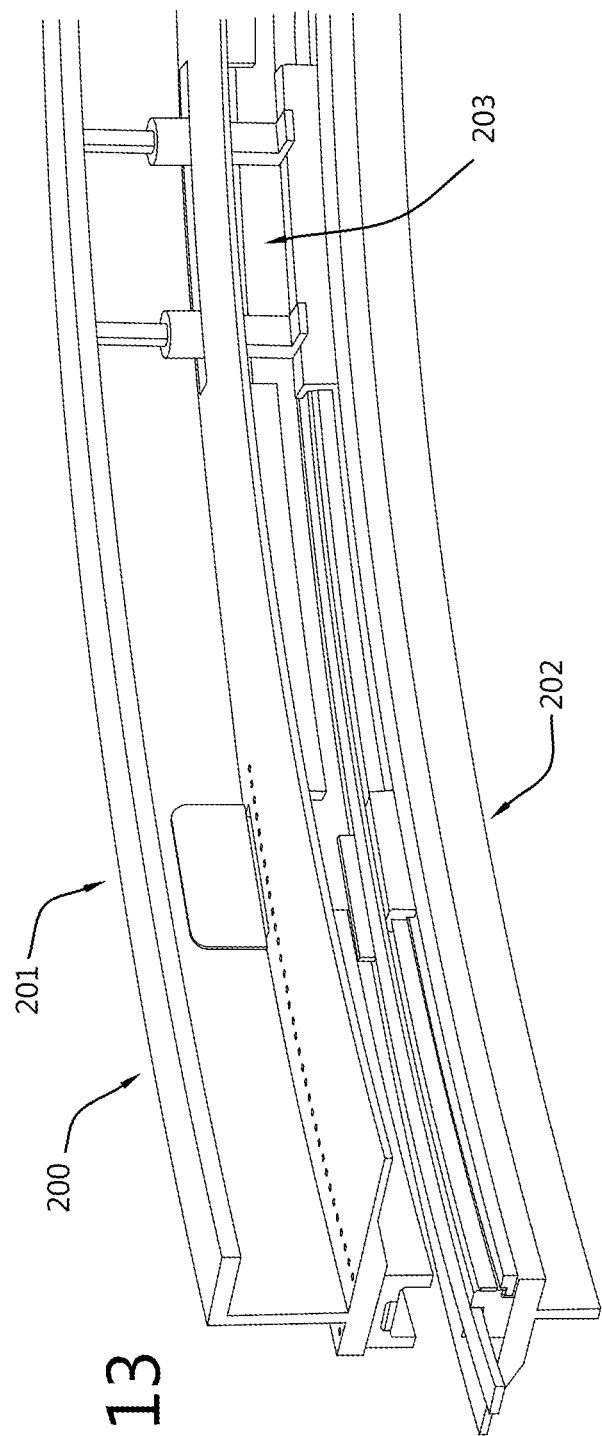

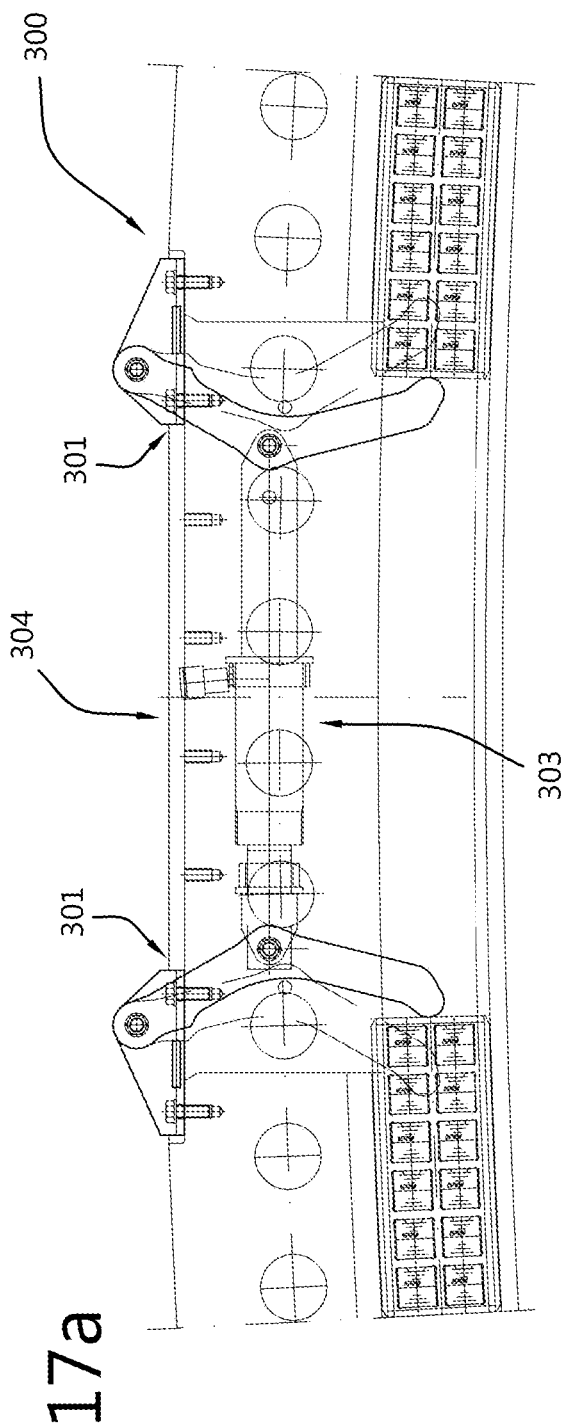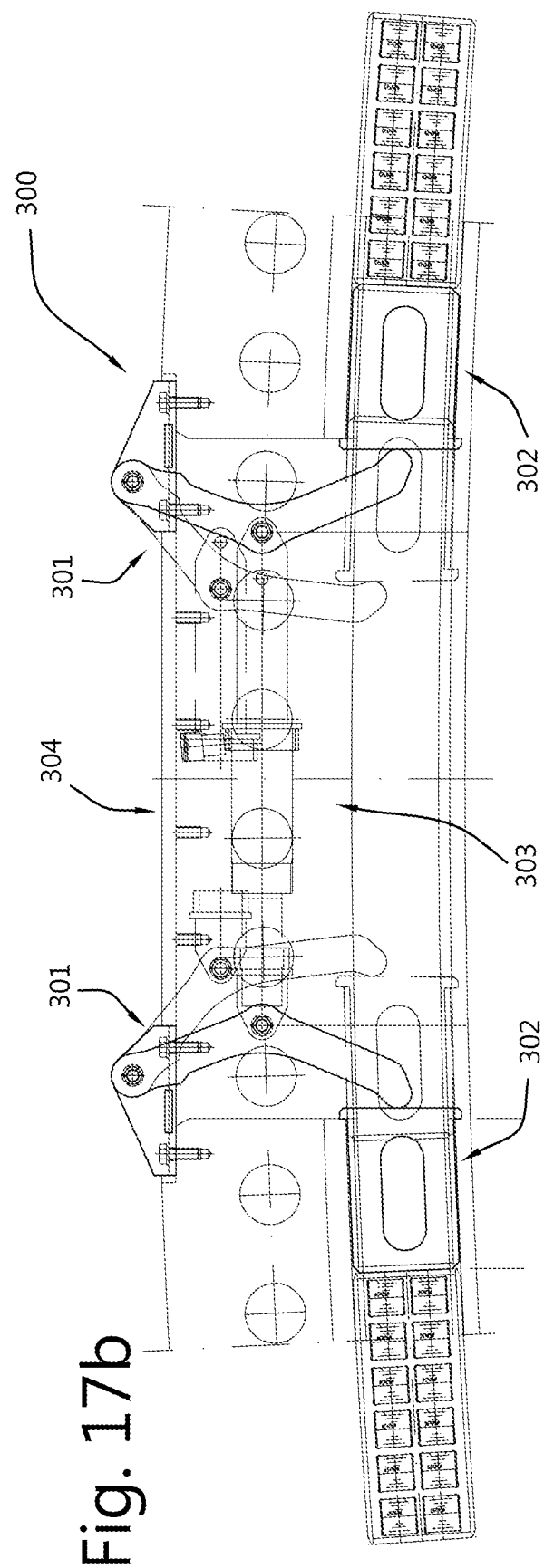

SLEW BEARING, METHOD FOR USING A SLEW BEARING, HOISTING CRANE AND VESSEL

The invention relates to a slew bearing, a method for using a slew bearing, and to a method for refurbishing a slew bearing, and a hoisting crane and a vessel.

Slew bearings are known to allow large structures to rotate relative to a base about a substantially vertical rotation axis while transmitting weight loads, tilting loads and/or radial loads between the large structure and the base.

An example of such a large structure is a hoisting crane which is a large type crane that is for example used in the off shore industry. Hoisting cranes have a crane structure comprising a crane housing and a jib, which jib is often configured to be pivoted about a substantially horizontal axis. The slew bearing is then provided between the crane housing and a base supporting the crane structure allowing the crane structure and thus the jib to be rotated about a vertical rotation axis.

Another example of such a large structure is a turret as for instance used in floating production, storage and offloading vessels, wherein a slew bearing is arranged between the turret and the hull of the vessel to allow weathervaning in which the vessel will normally lay head to the prevailing environment.

A drawback of slew bearings, especially large slew bearings that have to transmit relatively large loads, is that inspection and/or maintenance of the bearing may be regularly required to determine whether the slew bearing is still functioning properly and/or to keep the slew bearing in good condition. However, to allow inspection and/or maintenance, a part of or even the entire slew bearing needs to be dismantled to allow personnel access to the interior components of the slew bearing requiring inspection and/or maintenance. During this period, the slew bearing cannot perform its function and the large structure supported thereby are non-operational.

It is therefore an object of the invention to provide a slew bearing which requires less downtime as a result of inspection and/or maintenance.

This object is achieved by a slew bearing according to claim 1. A slew bearing according to claim 1 comprises:
- a stationary bearing ring to be fixed to a base;
- a moveable bearing ring to be fixed to a moveable object, e.g. a crane housing, and which moveable bearing ring is concentric with the stationary bearing ring,
- an upper main axial bearing for enabling rotation of the moveable bearing ring relative to the stationary bearing ring about a rotation axis, the upper main axial bearing having a row of axial load rollers, which rollers are arranged between a top roller raceway and a bottom roller raceway, the top roller raceway being connected to the moveable bearing ring and the bottom roller raceway being connected to the stationary bearing ring, and the rollers configured to transfer axial loads parallel to the rotation axis between the moveable bearing ring and the stationary bearing ring, wherein the moveable bearing ring comprises one or more main portions with at least a part of the top roller raceway of the upper main axial bearing and the stationary bearing ring comprises one or more main portions with at least a part of the bottom roller raceway of the upper main axial bearing wherein the one or more main portions of the moveable bearing ring are moveable relative to the one or more main portions of the stationary bearing ring between:

- an operational position, in which the at least part of the top roller raceway engages with axial load rollers to transfer axial loads between the moveable bearing ring and the stationary ring; and
- a raised maintenance position, in which the at least part of the top roller raceway is disengaged from the axial load rollers, wherein the slew bearing is provided with multiple actuator seats, each seat comprising a first seat section and a second seat section, which actuator seats are configured for receiving an actuator, e.g. a hydraulic cylinder or an electric spindle, between the first seat section and the second seat section, to enable the actuators received in the actuator seats to move the one or more main portions of the moveable bearing ring between the operational position and the raised maintenance position, wherein the slew bearing preferably is provided with actuators in the multiple actuator seats, and wherein the moveable bearing ring, preferably each of the one or more main portions of the moveable bearing ring, is provided with one or more top entry ports, which one or more top entry ports are provided in a top wall of the one or more main portions of the moveable bearing ring; and/or wherein the moveable bearing ring, preferably each of the one or more main portions of the moveable bearing ring, is provided with one or more side entry ports, which one or more side entry ports are provided in a side wall of the one or more main portions of the moveable bearing ring; and/or wherein the stationary bearing ring, preferably each of the one or more main portions of the stationary bearing ring, is provided with one or more side entry ports, which side entry ports are provided in a side wall of the one or more main portions of the stationary bearing ring;

which one or more top entry ports and/or one or more side entry ports provide access to the upper main axial bearing when the main portions are in the raised maintenance position and are dimensioned to at least enable inspection, and to preferably enable replacement, of the axial load rollers of the main bearing via the one or more top entry ports and/or the one or more side entry ports.

Thus, a slew bearing according to claim 1 comprises one or more entry ports that provide access to the actual bearing, more in particular to the axial load rollers of the bearing, while the moveable bearing ring comprises one or more main portions that are moveable, relative to the one or more main portions of the stationary bearing ring, between and operational position and a raised maintenance position. In the raised maintenance position at least part of the top roller raceway of the bearing is disengaged from the axial load rollers, which enables moving the axial load rollers along the bearing without the need of rotating the moveable bearing ring, and thus for rotating the structure, for example a crane, supported by the slew bearing.

By providing the slew bearing with entry ports, only a limited movement of the moveable bearing ring is required to move the bearing ring into the raised maintenance position, and allow for the bearing to be serviced, for example replaced. This allows for compact actuators and an overall more compact bearing design.

The invention furthermore provides the insight that the entry ports, once the moveable bearing ring has been moved in the raised maintenance position, can also be used to push the axial load rollers along the bearing.

The top roller raceway of the row of axial load rollers comprises a removable raceway segment releasable attached in the top entry port, for example releasable attached to the top wall or to another part of the moveable bearing ring, more in particular of a main portion of the moveable bearing ring, in which the port entry port is provided.

The removable roller raceway segment can be removed from said top entry port to enable access via said top entry port to the row of axial load rollers. Furthermore, the top entry port and the removable raceway segment are dimensioned such that, when the removable roller raceway segment has been removed, via the top entry port axial load rollers can be removed, and thus replaced, in a substantially vertical direction from the first row of axial load rollers.

The top entry port is provided above the first row of axial load rollers. When the slew bearing is in use, the removable raceway segment is secured in the top entry port and forms part of the top roller raceway of the row of axial load rollers. Thus, the top roller raceway crosses the top entry port. When the slew bearing is rotated with the removable raceway segment secured in the entry port, the removable raceway segment forms an integral part of the top roller raceway and thus guides axial load rollers across the top entry port.

For maintenance, control and/or refurbishment purposes the removable raceway segment is removed from the top entry port to allow direct access to axial load rollers of the first row of axial load rollers.

The top entry port of a slew bearing according to the invention is provided with a removable raceway segment that is part of the bearing, i.e. of the top roller raceway of the upper main axial bearing. The removable raceway segment can comprise several elements. For example, the removable raceway segment can comprise a raceway element which when in use forms part of the top roller raceway for guiding the axial load rollers, a hatch, which hatch in use is secured in the top entry port to secure the removable raceway elements in the top entry port, and a filler element, which filler element in use is provided between the raceway element and the hatch to secure the railway element to the hatch such that the railway element is correctly positioned in the top entry opening to form part of the top entry port. Such an embodiment of the removable raceway segment allows for replacing only one element. For example, when the raceway element is worn out or damaged, it can be replaced. The new raceway element is than used with the "old" hatch and filler segment. Thus, the costs of refurbishing the raceway segment can be kept low compared to replacing a single body replaceable raceway segment.

In a further embodiment, the slew bearing, more in particular the vertical wall of the main portion of the slew bearing, is provided with an opening above each top entry port, which opening provides access to the top entry port.

In an embodiment, the slew bearing is configured for securing the removable raceway segment in the top entry port. For example, when the removable raceway segment comprises a hatch for securing and/or supporting the removable raceway segment in the respective top entry port, the hatch and the slew bearing, can be provided with openings for receiving bolts, preferably stud bolts, to clamp the hatch against the slew bearing and thus secure the removable raceway segment in the top entry port.

In an embodiment, the invention provides a system comprising a slew bearing according to the claimed invention, e.g. claim 1, and an axial load rollers pushing device, i.e. a device configured to, via an entry port, engage and move the axial roller bodies along the bearing, and thus along the entry port, to position different axial load rollers at an entry port for inspection and/or servicing and/or replacement.

In an embodiment, the axial load rollers pushing device is configured as a device for engaging a roller bodies cage, i.e. a frame comprising multiple axial load rollers, via an entry port, and for pushing that roller bodies cage, and thus adjacent roller bodies cages present in the bearing, along at least a section of the circumference of that bearing.

In an embodiment according to the invention, the slew bearing is configured to, and/or the slew bearing comprises actuators configured to, move the one or more main portions of the moveable bearing ring over a limited distance between the operational position and the raised maintenance positon, preferably over a distance smaller than four times the diameter of the axial load rollers, more preferably over a distance smaller than three times the diameter of the axial load rollers, more preferably over a distance smaller than two times the diameter of the axial load rollers, most preferably over a distance smaller than the diameter of the axial load rollers. In such an embodiment, the bearing is configured to enable servicing and/or replacement of the axial load rollers via the entry ports only. Such a bearing can be provided with compact actuators for moving the moveable bearing ring, more in particular the main portions of the moveable bearing ring, into and out of the raised maintenance position.

In an alternative embodiment, the slew bearing is configured to lift the moveable bearing ring into a position that provides direct access to the bearing, i.e. in which the bearing can be accessed, and axial load rollers can be removed and replaced, via the gap between the stationary bearing ring and the moveable bearing ring. Such an embodiment does however require actuators that can move the moveable bearing ring, more in particular the one or more main portions thereof, over a significant distance, i.e. a distance of more than four times a diameter of an axial load roller.

Thus, in an embodiment, the range of movement of the one or more main portions of the moveable bearing ring, when being moved between the operational position and the raised maintenance position, is limited. In an embodiment, the one or more main portions of the moveable bearing ring can be lifted up to a maximum height of less than four times the diameter of the axial load rollers, more preferably of less than two times the diameter of the axial load rollers, most preferably of less than the diameter of the axial load rollers.

In an embodiment of a slew bearing according to the claimed invention, the first seat section is fixed to the stationary bearing ring and the second seat section is fixed to the moveable bearing ring, to enable actuators received in the actuator seats to move the one or more main portions of the moveable bearing ring between the operational position and the raised maintenance position. In an alternative embodiment, the first seat sections are fixed not to the stationary bearing ring but to the base the base to which the stationary bearing ring is fixed, e.g. the pedestal fo a crane.

In an alternative embodiment, the slew bearing comprises an upper auxiliary axial bearing having upper low-friction pads arranged on the moveable bearing ring and corresponding lower low-friction pads arranged on the stationary bearing ring to, when at least one of the main portions of the moveable bearing ring is in the raised maintenance position, engage with the upper low-friction pads, in order to transfer axial loads parallel to the rotation axis between the moveable bearing ring and the stationary bearing ring when the upper and lower low-friction pads engage with each other.

In such an embodiment, when the one or more main portions of the moveable bearing ring are in the raised maintenance position, the moveable bearing ring is supported by the stationary bearing ring via the upper auxiliary axial bearing. Thus, the bearing can be rotated when the moveable bearing ring, more in particular the one or more main portions of the main bearing ring, are in the raised maintenance position.

In a further embodiment according to the invention, the moveable bearing ring comprises one or more auxiliary portions each auxiliary portion comprising at least a part of the upper low-friction pads, and the first seat sections are each fixed to one of the one or more auxiliary portions of the moveable bearing ring, and the second seat sections are each fixed to one of the one or more main portions of the moveable bearing ring, to enable actuators received in the actuator seats to move the one or more main portions of the moveable bearing ring relative to auxiliary portions of the moveable bearing ring, and thus move the main portions of the moveable bearing ring between the operational position and the raised maintenance position.

In such an embodiment, by lowering the one or more auxiliary portions of the moveable bearing ring relative to the one or more main portions of the moveable bearing ring, the upper low-friction pads of the moveable bearing ring, provided on the auxiliary portions thereof, engage the lower low-friction pads provided on the stationary bearing ring. Once the auxiliary portions of the moveable bearing ring are thus supported by the stationary bearing ring, the actuators can be used to lift the one or more main portions of the moveable bearing ring into the raised maintenance position.

In an alternative embodiment according to the claimed invention, the stationary bearing ring comprises one or more auxiliary portions (13a) each auxiliary portion comprising at least a part of the lower low-friction pads, and the first seat sections are each fixed to one of the one or more auxiliary portions of the stationary bearing ring, and the second seat sections are each fixed to one of the one or more main portions of the stationary bearing ring, to enable the actuators received in the actuator seats to move the one or more main portions of the stationary bearing ring relative to auxiliary portions of the stationary bearing ring, and thus move the main portions of the moveable bearing ring between the operational position and the raised maintenance position.

In such an embodiment, by lifting the one or more auxiliary portions of the stationary bearing ring relative to the one or more main portions of the stationary bearing ring, the lower low-friction pads of the stationary bearing ring, provided on the auxiliary portions thereof, engage the upper low-friction pads of the moveable bearing ring. Once the auxiliary portions of the stationary bearing ring thus support the moveable bearing ring, the actuators can lift the moveable bearing ring, more in particular the one or more main portions of the moveable bearing ring, into the raised maintenance position.

As an alternative, the lower low-friction pads of the stationary bearing ring can be made to engage the upper low-friction pads of the moveable bearing ring by lowering the one or more main portions of the stationary bearing ring relative to the one or more auxiliary portions of the stationary bearing ring. Once the auxiliary portions of the stationary bearing ring are thus made to support the moveable bearing ring, the actuators can lower the main portions of the stationary bearing ring relative to the moveable bearing ring, more in particular relative to the one or more main portions of the moveable bearing ring, and thus bring the latter into the raised maintenance position.

In a further preferred embodiment, the moveable bearing ring and/or the stationary bearing ring comprises one or more main portions and one or more auxiliary portions, which main portions can be moved relative to the auxiliary portions, and the main portions and the auxiliary portions are configured to be temporarily fixed to each other when the moveable bearing ring, more in particular the main one or more main portions of the moveable bearing ring, is in the raised maintenance position and/or is in the operational position, such that the actuators do not need to actively support the main or auxiliary portions.

For example, the main portions and the auxiliary portions can be provided with through openings that are in line with each other when the moveable bearing ring, more in particular the one or more main portions of the moveable bearing ring, is in the raised maintenance position, such that a rod can be inserted, for example a bolt, to temporarily fix the main portions and the auxiliary portions to each other.

In a further embodiment, the actuators can even be removed from the actuator seats once the moveable bearing ring, more in particular the one or more main portions of the moveable bearing ring, is moved into the raised maintenance position and/or once the moveable bearing ring, more in particular the one or more main portions of the moveable bearing ring, is moved into the operational position.

In an alternative embodiment, the moveable bearing ring or the stationary bearing ring comprises main portions and auxiliary portions, and the actuators are provided between the main portions and the auxiliary portions to move the moveable bearing ring, more in particular the main portions of the moveable bearing ring, into the raised maintenance position as was set out above, but there is not provided an upper auxiliary axial bearing. In such an embodiment, the slew bearing can not be rotated when the one or more main portions of the moveable bearing ring are in the raised maintenance position.

According to a second aspect, the invention furthermore provides a slew bearing, the slew bearing comprising:
  a stationary bearing ring to be fixed to a base;
  a moveable bearing ring to be fixed to a moveable object,
    e.g. a crane housing, and which moveable bearing ring
    is concentric with the stationary bearing ring,
  wherein the stationary bearing ring and the moveable bearing ring are configured to enable rotation of the moveable bearing ring relative to the stationary bearing ring about a rotation axis,
  wherein the slew bearing further comprises an upper main axial bearing having a row of axial load rollers, which rollers are arranged between a top roller raceway and a bottom roller raceway, said top roller raceway being connected to the moveable bearing ring and said bottom roller raceway being connected to the stationary bearing ring, and said rollers configured to transfer axial loads parallel to the rotation axis between the moveable bearing ring and the stationary bearing ring,
  wherein the slew bearing further comprises an upper auxiliary axial bearing having upper low-friction pads arranged on the moveable bearing ring and corresponding lower low-friction pads arranged on the stationary bearing ring to engage with the upper low-friction pads, wherein the upper low-friction pads are arranged parallel to the top roller raceway, and the lower low-friction pads are arranged parallel to the bottom roller raceway in order to transfer axial loads parallel to the rotation axis between the moveable bearing ring and the stationary bearing ring when the upper and lower low-friction pads engage with each other, wherein the moveable bearing ring comprises one or more main portions with at least a part of the top roller raceway of the upper main axial bearing and one or more corresponding auxiliary portions, each auxiliary portion comprising at least a part of the upper low-friction pads, wherein the one or more main portions are moveable relative to the corresponding one or more auxiliary portions between an operational position, in which the at least part of the top roller raceway engages with axial load rollers to transfer axial loads between the moveable bearing ring and the stationary ring, and a raised maintenance position, in which the at least part of the top roller raceway is disengaged from the axial load rollers, and wherein the one or more auxiliary portions are configured such that the at least part of the upper low-friction pads are engageable with lower low-friction pads when the corresponding one or more main portions are in the raised maintenance position to transfer axial loads between the moveable bearing ring and the stationary ring.

It is submitted that the slew bearing according to claim 1, and a slew bearing according to the second aspect of the invention can be combined with similar features to provide further inventive slew bearings. Also, in a preferred embodiment of the slew bearing according to the second aspect of the invention, it is provided one or more entry ports to provide access to the axial load rollers of the upper main axial bearing. Thus it shares the main inventive concept of the slew bearing according to claim 1.

The advantage of the slew bearing according to the second aspect of the invention is that at least a part of the top roller raceway can be disengaged from the rollers for inspection of and/or maintenance to the upper main axial bearing while the corresponding loss of transferability of axial loads is compensated for by the upper auxiliary axial bearing so that during the inspection and/or maintenance the slew bearing is still operational although in some applications or embodiments it may be preferred to perform inspection and/or maintenance during favourable conditions as the full capacity of the slew bearing may not be available.

As was already mentioned above, in a preferred embodiment of the slew bearing according to the second aspect of the invention, the moveable bearing ring, more in particular, at least one main portion of the movable bearing ring, has a top wall, which top wall extends above the row of axial load rollers and in which top wall at least one top entry port is provided to allow access, from above, to the row of axial load rollers, and wherein the top roller raceway of the row of axial load rollers comprises a removable raceway segment releasable attached in the top entry port, for example releasable attached to the top wall or to another part of the moveable bearing ring in which the port entry port is provided.

The removable roller raceway segment can be removed from said top entry port to enable access via said top entry port to the row of axial load rollers. Furthermore, the top entry port and the removable raceway segment are dimensioned such that, when the removable roller raceway segment has been removed, via the top entry port axial load rollers can be removed, and thus replaced, in a substantially vertical direction from the first row of axial load rollers.

The top entry port is provided above the first row of axial load rollers. When the slew bearing is in use, the removable raceway segment is secured in the top entry port and forms part of the top roller raceway of the row of axial load rollers. Thus, the top roller raceway crosses the top entry port. When the slew bearing is rotated with the removable raceway segment secured in the entry port, the removable raceway segment forms an integral part of the top roller raceway and thus guides axial load rollers across the top entry port.

For maintenance, control and/or refurbishment purposes the removable raceway segment is removed from the top entry port to allow direct access to axial load rollers of the first row of axial load rollers.

It is noted that the removable raceway segment can be provided in the form of a single body element. For example, the removable raceway segment can be provided in the form of a steel plug that fits the top entry port, and which steel plug is provided with a hardened bottom surface that functions as the actual raceway. For securing the plug in the top entry port, for example the plug and the top wall of the moveable bearing ring can be provided with openings, which openings are in line with each other when the plug has been correctly positioned in the top entry port. By subsequently passing rods or bolts through the openings, the steel plug can be secured in the top entry port with its bottom surface continuing the top roller raceway across the top entry port. Thus, with the removable raceway segment in place, the top roller raceway guides axial load rollers of the row of rollers across the top entry port, and the slew bearing is ready for use.

Alternatively, the removable raceway segment can comprise several elements. For example, the removable raceway segment can comprise a raceway element which when in use forms part of the top roller raceway for guiding the axial load rollers, a hatch, which hatch in use is secured in the top entry port to secure the removable raceway elements in the top entry port, and a filler element, which filler element in use is provided between the raceway element and the hatch to secure the railway element to the hatch such that the railway element is correctly positioned in the top entry opening to form part of the top entry port. Such an embodiment of the removable raceway segment allows for replacing only one element. For example, when the raceway element is worn out or damaged, it can be replaced. The new raceway element is than used with the "old" hatch and filler segment. Thus, the costs of refurbishing the raceway segment can be kept low compared to replacing a single body replaceable raceway segment.

When provided with one or more top entry ports, the slew bearing allows for direct access to the axial load rollers of the row of axial load rollers. Via the top entry port, the rollers can be inspected and, if needed replaced.

By rotating the slew bearing, the top entry port can be moved along the rollers of the row of axial load rollers. Thus, the axial load rollers of the row of axial load rollers can all be inspected and replaced without the need of taking apart the slew bearing.

In an embodiment, the one or more actuators are used to lift the one or more main portions of the moveable bearing ring into the raised maintenance position, such that the at least part of the top roller raceway is disengaged from the axial load rollers, to enable the axial load rollers to be pushed along the raceways, i.e. along the circumference of the slew bearing. Unloading the axial load rollers by lifting part of the moveable bearing ring allows the axial load rollers to be moved along the raceway without having to rotate the moveable bearing ring.

In a further preferred embodiment, the slew bearing is not only provided with an actuator for unloading the axial load rollers, but also with one or more top entry ports and/or side entry ports that provide access to the axial load rollers. Such a slew bearing greatly facilitates maintenance. The slew bearing does not need to be dismantled to provide access to the axial load rollers. Furthermore, the slew bearing does not need to be rotated to provide access to the axial load rollers. This is especially beneficial for large slew bearings supporting large loads, e.g. large cranes or turrets, which loads make it difficult and time consuming to rotate the slew bearing.

Furthermore, due to the one or more entry ports, the main parts of the moveable slew bearing do only need to be lifted a small amount to enable access to the axial load rollers.

Thus, such a slew bearing hugely facilitates maintenance and furthermore allows for maintenance in situ, for example at sea, since the slew bearing does not need to be dismantled and the structure supported by the slew bearing does not need to be rotated to present the axial load rollers at the entry ports.

It is submitted that the features disclosed above and below in combination with the slew bearing according to the second aspect, for example the moveable race way segment or the use of a hath to close the entry port, can also be combined with a slew bearing according to claim 1.

In an embodiment, the slew bearing comprises, in addition to the upper main axial bearing, a second or auxiliary bearing between the auxiliary portions of the moveable bearing ring and the stationary bearing ring, and one or more actuators, are provided between the main portions and the auxiliary portions of the moveable bearing ring, such that when the main portions of the moveable bearing ring are supported in the raised maintenance position, the moveable bearing ring can be rotated, with the main portions in the raised maintenance position, over the secondary bearing.

It is submitted that such a second or auxiliary bearing can be of a less robust design than the upper main axial bearing, since it is only used, and only loaded, during maintenance of the upper main axial bearing.

In an embodiment according to the invention, the slew bearing is provided with multiple rows of axial load rollers, each of these rows being provided between the moveable and stationary bearing ring to transmit loads in a substantially downward direction. Preferably, each of these rows is provided with one or more top entry port and/or one or more side entry ports are provided that allow access to two or more parallel rows of axial load rollers.

In a further embodiment of a slew bearing according to the invention, the stationary bearing ring comprises a flange section which extends in the radial direction and the moveable bearing ring has a substantially C-shaped cross section, having an top section, comprising the one or more main portions which one or more main portions are preferably provided with the top wall with the at least one top entry port, a mid-section and a bottom section, the bottom section and optionally the mid-section comprising the one or more auxiliary portions of the moveable bearing ring.

In such an embodiment the moveable bearing ring engages the flange section of the stationary bearing ring such that its top section, i.e. the upper leg of the C-shape when seen in cross section, extends above the flange section of the stationary bearing ring and the bottom section, i.e. the lower leg of the C-shape when seen in cross section, extends below the flange section of the stationary bearing ring.

Furthermore, in such an embodiment the row of axial load rollers is provided between the top section of the moveable bearing ring and the flange section of the stationary bearing ring, with the top and bottom roller raceways attached to the moveable bearing ring and the stationary bearing ring respectively.

In a further embodiment the slew bearing comprises a second row of axial load rollers, which second row of axial load rollers is an auxiliary support row of axial load rollers for preventing tipping of the moveably bearing ring, between the stationary bearing ring and the moveable bearing ring. In such an embodiment, the first and the second row of axial load rollers are each provided between a corresponding top roller raceway and bottom roller raceway, which top and bottom roller raceways are each connected to one of the bearing rings. The first row of axial load rollers is provided to transmit axial loads in a substantially downward direction between the moveable bearing ring and stationary bearing ring. These forces are associated with weight loads, for example the weight of the crane structure and of an object lifted by the crane. The second row of axial load rollers is provided to transmit axial loads in a substantially upward direction between the moveable bearing ring and the stationary bearing ring. These forces are associated with tilting loads, for example as a consequence of a crane mounted on said moveable bearing ring supporting a lifted object using a jib.

It is submitted that such a second row of axial load rollers, or a similar bearing device, e.g. a low friction pads, configured to prevent tipping of the moveable bearing ring, is provided between the stationary bearing ring and the one or more auxiliary portions of the moveable bearing ring.

In an embodiment, the second row of axial load rollers is provided between the bottom section of the moveable bearing ring, i.e. the one or more auxiliary portions of the moveable bearing ring, and a flange section of the stationary bearing ring, with the top and bottom roller raceways attached to the stationary bearing ring and the moveable bearing ring respectively. Thus, the first and second row of axial rollers are located on opposite sides of the flange section. In a further embodiment, the first and second row of axial rollers are positioned directly above each other, such that axial forces transferred between the moveable bearing ring and the stationary bearing ring via the first row of axial load rollers and axial forces transferred between the moveable bearing ring and the stationary bearing ring via the second row of axial load rollers extend in the same vertical cylindrical plane.

In an embodiment, the flange section of the stationary bearing ring extends in the radially outward direction. In such an embodiment, the opening of the C-shaped cross section of the moveable bearing ring is directed towards the rotational axis of the slew bearing and the mid-section of the moveable bearing ring is directed radially outward.

In an alternative embodiment, the flange section of the stationary bearing ring extends in the radially inward direction. In such an embodiment, the opening of the C-shaped cross section is directed radially outward and the mid-section of the moveable bearing ring is directed radially towards the rotational axis of the slew bearing.

In a further embodiment of a slew bearing according to the invention the moveable bearing ring has a circumferential side wall, which side wall extends alongside the second row of axial load rollers, i.e. the row of axial load rollers preventing tipping of the moveable bearing ring. In this embodiment in the side wall at least one side entry port is configured to allow access, in a lateral direction, to the second row of axial load rollers. In each side entry port a removable insert is provided, which is releasable attached in the side entry port, i.e. is releasable attached to the side wall or to another part of the bearing ring in which the side port is provided. As is the case with the removable railway segment of the top entry port, the insert of the side entry port can be a single body element, or may comprises multiple elements which together form the removable insert.

In an embodiment, the circumferential side wall comprising the side entry port is part of the moveable bearing ring, the moveable bearing ring having a C-shaped cross section. In such an embodiment, the side entry port is preferably provided in a side wall that is part of the mid-section of the C-shaped cross section.

Preferably the side wall guides the axial load rollers in a circumferential direction. In this preferred embodiment, the wall can be provided with guides, such as guide strips, or have a surface suitable for guiding the axial load rollers. In an embodiment in which the axial load rollers are provided in roller bodies cages that position the axial load rollers at a mutual distance, each roller bodies cage holding two or more axial load rollers, the side wall is provided with a guide surface or with guides, such as guide strips, for guiding those roller bodies cages.

In case the side wall is configured to guide the axial load rollers, or the axial load roller bodies cages, the insert has a guide surface that, when the insert is provided in the side entry port, is part of the circumferential side wall for guiding the axial load rollers in the circumferential direction. Thus, the insert can be provided with guides, such as guide strips, or have a surface suitable for guiding the axial load rollers or roller bodies cages comprising those axial load rollers.

In an alternative embodiment of a hoisting crane according to the invention, the at least one side entry port is provided in a circumferential side wall of the stationary bearing, which bottom bearing side wall extends alongside the second row of axial load rollers and preferably guides these axial load rollers in a circumferential direction.

In any configuration of this embodiment, the side entry port is dimensioned such that, when the removable insert has been removed from the side entry port, via the side entry port axial load rollers can be removed and replaced in a substantially lateral direction from the second row of axial load rollers. In a further embodiment, the axial load rollers are provide in roller bodies cages to position the axial load rollers relative to each other, each roller bodies cage comprising multiple axial rollers. In such an embodiment, the side entry port is dimensioned such that a roller bodies cage, the roller bodies cage holding two or more axial load rollers, can be replaced via the side entry port.

Providing a side entry port allows for direct access to the axial load rollers of the second row of axial load rollers. Via the side entry port, the rollers can be inspected and, if needed replaced. Furthermore, by rotating the slew bearing the side entry port can be moved along the rollers in the second raceway. Thus, with such a slew bearing the axial load rollers of the first row of axial load rollers can all be inspected and replaced via the top entry port and the axial load rollers of the second row can all be inspected and replaced via the side entry port, all without the need of taking apart the slew bearing.

In an embodiment, the moveable bearing ring, in particular the one or more main portions of the moveable bearing ring, comprises a side wall with one or more side entry ports, similar to the one discussed above, to provide access to the row of axial load rollers of the upper main axial bearing. This one or more side entry ports can be provided in addition or as an alternative to one or more top entry ports providing access to said row of axial load rollers of the upper main axial bearing.

In a further embodiment, the side entry port is dimensioned such that it also exposes the sides of the upper and/or lower raceways, which raceways comprise raceway segments which can be slid in a lateral direction through the side entry port opening. For example, when the side entry port is provided in a side wall of the moveable bearing ring, rotating the slew bearing about its rotational axis moves the side entry port along the upper raceway of the second row of axial load rollers. Providing an upper raceway comprising sections that can be slid into and out off position in a lateral direction, and a side entry port that is dimensioned such that the upper raceway sections can be passed through it, allows for refurbishing the entire upper raceway without the need of taking apart the slew bearing.

In an embodiment according to the invention, the moveable bearing ring has a C-shaped cross section of which the bottom section comprises multiple semi-circular bottom section segments, each extending along part of a circumference of the moveable bearing ring. The semi-circular bottom section segments are releasable attached to the midsection and the top section of the moveable bearing ring, such that each one can be removed, preferably while the other segments remain attached to the moveable bearing ring, to expose part of the second row of axial load rollers and part of the upper and lower roller raceway guiding the second row of axial load rollers. When such a bottom section segment has been removed, the exposed rollers and the parts of the upper and lower raceways that are exposed can be replaced if needed.

Thus, this embodiment allows for the raceways for guiding the second row of axial load rollers to be refurbished while the moveable bearing ring is supported, via the row of axial load rollers of the main axial bearing, on the stationary bearing ring. It is thus not necessary to disassemble the entire slew bearing or to the remove any structure, e.g. a crane structure, from the slew bearing when the raceways of the second row of axial load rollers needs to be replaced. This saves time and effort.

It is however noted that, in contrast with the side entry port, removing such a bottom segment does not allow for rotating the slew bearing to expose other axial load rollers of the second row. To expose other axial load rollers or raceway segments of the second row or rollers, another semi-circular bottom section segment should be removed.

In a an embodiment in which one bearing ring comprises a flange section which extends in the radial direction, preferably the radially outward direction, and the other bearing ring has a substantially C-shaped cross section engaging the flange section, the flange section has at its end a substantially vertical guide surface, and the bearing ring with the substantially C-shaped cross section has a midsection that forms a circumferential wall extending along the substantially vertical guide surface of the flange section. In this embodiment, between the substantially vertical guide surface and the midsection preferably guides, for example guide strips or anti-friction elements, are provided for supporting radial loads.

In a further embodiment, the mid-section of the bearing ring with the C-shaped cross section comprises multiple semi-circular segments, each extending along part of a circumference of the bearing ring, which semi-circular segments are releasable attached to the bottom section and the top section of that bearing ring, preferably the moveable bearing ring. Thus, the semi-circular segments can be removed to expose part of the substantially vertical guide surface and the guides, which allows for inspection and refurbishment thereof.

In an embodiment, the moveable bearing ring has a C-shaped cross section and comprises semi-circular bottom section segments. In a further embodiment, the moveable bearing ring also comprises semi-circular mid-section segments. The semi-circular bottom section segments are attached to the mid-section and/or the top section to form a functional moveable bearing ring. When the moveable bearing ring also comprises semi-circular mid-section segments, the semi-circular bottom section segments and the semi-circular mid-section segments are attached to the top section of the moveable bearing ring to form a functional moveable bearing ring.

In an embodiment, the top section, the mid-section and the bottom section are provided with substantially vertical openings. These vertical openings are indexed openings, i.e. when the semi-circular bottom section segments and, if provided, the semi-circular mid-section segments are in the correct position to form the bearing ring, the vertical openings are in line and bolts, preferably stud bolts, are passed through them to clamp the semi-circular bottom section segments and/or the semi-circular mid-section segments against the top section of the moveable bearing ring.

In a further embodiment, the slew bearing is provided with a slew bearing platform, which slew bearing platform is also provided with openings for receiving bolts, preferably stud bolts, which openings are indexed with the above mentioned openings such that the strut bolts used for clamping the semi-circular segments to the top section of the bearing ring at the same time clamp the slew bearing platform against the moveable bearing ring.

In an embodiment, the moveable bearing ring comprises semi-circular bottom section segments and semi-circular mid-section segments. To compose a relatively stiff moveable bearing ring, the semi-circular mid-section segments and the semi-circular bottom section segments are positioned relative to each other such that they overlap, more in particular overlap in the circumferential direction. Thus, when they are clamped to the top section of the bearing ring, for example using stud bolts, the semi-circular lower segment sections lie head to head at other locations than the semi-circular mid-section segments.

For example, when a bearing ring has a C-shaped cross section and comprises semi-circular mid-section segments and semi-circular bottom section segments, the segments are preferably provided such that they overlap each other in the circumferential direction, and are mounted to the top section of the bearing ring using indexed through holes and strut bolts, which extend through the bottom, the mid-section and the top section. This allows for removing one semi-circular segment at the time. For example, when the strut bolts supporting a semi-circular mid-section are removed, these strut bolts are also removed from the through holes of the overlapping parts of the two overlapping semi-circular bottom sections. The latter are however still supported by the strut bolts mounted in the trough holes of the parts that overlap with the adjacent semi-circular mid sections. Thus, the semi-circular mid-section of which the strut bolts have been removed can be removed from the bearing ring while the two overlapping semi-circular bottom sections remain in place and attached to the bearing ring.

In a further embodiment, the semi-circular mid-sections overlap with the semi-circular bottom sections, in the circumferential direction, and are shorter than the semi-circular bottom section segments. For example, the semi-circular mid-sections each extend over an angle of 30 degrees while the semi-circular bottom sections extend over an angle of 60 degrees. To form the top bearing, the semi-circular mid-sections are positioned relative to the semi-circular bottom sections such that that they overlap them, i.e. a semi-circular mid-section segment is located above the location where two semi-circular bottom sections lie head to head.

In an embodiment according to the invention, the slew bearing is provided with a slew platform supporting a jib crane, and the slew platform and the jib of the jib crane are essentially symmetric relative to a vertical plane of symmetry, which vertical plane of symmetry comprises the pivot axis of the slew bearing. Thus, the plane of symmetry divides both the slew bearing and the crane structure, the crane structure comprising the jib, into two substantially similar halves. Such a configuration of a hoisting crane is not uncommon in the prior art. Typically the hoisting wire of the crane lies in the plane of symmetry also or runs substantially parallel thereto.

In a further embodiment according to the invention, the hoisting crane is provided with two top entry ports, which top entry ports are provided each on one side of the plane of symmetry, preferably are provided symmetrically relative to the plane of symmetry. In such an embodiment, the row of axial load rollers of the upper main axial bearing is provided to mainly support axial load forces due to the weight of the crane structure. It is observed that these vertically downward directed forces are partially cancelled by the vertical upward directed forces related to the tilting load caused by the jib of the hoisting crane. It is observed that due to the interaction of these two types of loads, the axial forces exerted on the first row of axial load rollers has a minimum, more in particular is essentially none existent, in two locations located on opposite sides of the above mentioned plane of symmetry. The top entry ports are preferably provided each near, preferably at, such a location.

It is noted that the locations where the axial load exerted on the axial load rollers of the row of rollers depends on the configuration of the jib and crane structure, more in particular depends on the tilting load generated by the jib.

In an embodiment of a hoisting crane mounted on a slew bearing according to the invention, the axial forces transferred through the row of axial load rollers is minimal at or near a vertical plane extending perpendicular to the plane of symmetry and comprising the rotational axis of the slew bearing. In this embodiment, preferably the top entry ports are located in the moveable bearing ring such that they are intersected by that perpendicular extending plane, preferably are located such that they both extend symmetrical on opposite sides of that plane. By providing the top entry ports at these locations, no or only a comparatively small force is needed to insert and attach the removable railway segment inside the top entry port.

In an embodiment according to the invention, the axial load rollers, e.g. the rollers of the row of axial load rollers of the upper main axial bearing, are provided in roller bodies cages, which roller bodies cages position the rollers relative to each other. By providing these roller bodies cages the axial load rollers are prevented from running in to each other. It is noted that providing axial load rollers in such cases is known from the prior art. Typically, each roller bodies cage holds at least two rollers, preferably holds at least four rollers, for example holds six cylindrical roller bodies.

In an embodiment, the one or more top entry ports is/are dimensioned such that the roller bodies cage with its rollers can be removed and replaced via said top entry port. In an embodiment, the one or more side entry ports is/are dimensioned such that the roller bodies cage with its rollers can be removed and replaced via said side entry port.

In a further embodiment, the moveable bearing ring comprises a ring shaped wall, supporting structure, for example a crane, located vertically above the row of roller bearings of the upper main axial bearing. By locating the ring shaped wall directly above the row of axial load rollers, the vertical loads are transferred from the moveable bearing ring via the axial load rollers to the stationary bearing ring in a substantially vertical direction, i.e. without generating an additional moment load in the top wall of the moveable bearing ring.

In a further embodiment, when seen in a cross sectional view, the row of axial load rollers and the second row of axial load rollers are positioned vertical above each other, and the ring shaped wall is located vertically above the rows of axial load rollers. Thus, the contact surfaces, in the form of the axial load rollers, between the two bearing rings are in line with the ring shaped wall via which the loads exerted by the structure are transferred onto the bearing ring. Providing the axial load rollers on a vertical line with the circular wall thus allows for a minimum of bending moments in the bearing layer, which in turn reduces wear of the bearing.

In a further embodiment, the slew bearing, more in particular the vertical wall of the slew bearing, is provided with an opening above each top entry port, which opening provides access to the top entry port.

In a further embodiment, the slew bearing is configured for securing the removable raceway segment in the top entry port. For example, when the removable raceway segment comprises a hatch for securing and/or supporting the removable raceway section in the respective top entry port, the hatch and the slew bearing, can be provided with openings for receiving bolts, preferably stud bolts, to clamp the hatch against the slew bearing and thus secure the removable raceway segment in the top entry port.

In an embodiment, the slew bearing supports a crane having a base, which base of the crane comprises a tub, which tub is provided with openings for receiving bolts, preferably stud bolts, to clamp a slew bearing platform, and thus the base, against the stationary bearing ring.

The invention furthermore provides a method for replacing axial load rollers of a slew bearing according to the invention, the method comprising the steps:

a) moving one or more main portions of the moveable bearing ring in the raised maintenance position and detaching and preferably removing a removable top roller raceway segment located in the top entry port, to provide access to the axial load rollers of the upper main axial bearing;

b) remove one or more axial load rollers from the upper main axial bearing, preferably remove multiple axial load rollers by removing a roller bodies cage holding two or more axial load rollers, via the top entry port;

c) replace one or more axial load rollers, preferably replacing multiple axial load rollers by placing a roller bodies cage holding two or more rollers, in the upper main axial bearing via the top entry port;

d) optionally: use an axial load rollers pushing device, i.e. a device configured to, via an entry port, engage and move the axial roller bodies along the bearing, and thus along the top entry port, to position different axial load rollers at the top entry port for inspection and/or servicing and/or replacement;

e) optionally: repeat steps b, c, and d;

f) replace and attach the removable top roller raceway segment in the top entry port and moving the one or more main portions of the moveable bearing ring back into the operational position.

In an embodiment, an actuator device comprising multiple actuators is provided to move the one or more main portions between the operational position and the raised maintenance position. For example, the actuator device may comprise multiple hydraulic or electric cylinders, configured for lifting part of the moveable bearing ring, more in particular for lifting the one or more main portions of the moveable bearing ring, relative to the one or more auxiliary portions of the moveable bearing ring. For example, the actuator device can be provided in the form of a hydraulic jack system, the system comprising jacks located along the circumference of the bearing.

In an embodiment, the actuator device is provided between the main portions of the bearing ring and the auxiliary portions of the bearing ring. In such an embodiment, the actuator device is supported by the auxiliary portions while it supports the main portions in the raised maintenance position.

In an alternative embodiment, the actuator device is provided between the one or more main portions and the stationary bearing ring. In such an embodiment, the actuator device is supported by the stationary bearing ring while it supports the main portions in the raised maintenance position.

In an embodiment, the moveable bearing ring comprises a single main portion and a single auxiliary portion, but it is also envisaged that a plurality of auxiliary portions are provided that are evenly distributed over the circumference of the moveable bearing ring, e.g. ten auxiliary portions of about one meter long every 36°.

In an embodiment, the one or more main portions comprise the entire top roller raceway so that the entire upper main axial bearing can be inspected and/or maintained at once. In case the one or more main portions comprise only a part of the entire roller raceway, all the rollers can be inspected and/or maintained by either pushing the rollers around or by rotating the large structure until the rollers of interest are located at a main portion in the raised maintenance position to allow access to these rollers of interest. In this way all the rollers can be inspected and/or maintained.

In an embodiment, the rollers are provided in a plurality of roller bodies cages, wherein preferably at least one of the roller bodies cages or the rollers contained therein is provided with a sensor for measuring a parameter or the condition of the slew bearing and a memory for storing measurement data. Providing a main portion in the raised maintenance position then allows to read out the memory to get offline access, e.g. by making a physical connection, to the measurement data omitting the need of (real-time) wireless communication. This also applies to applications that do not make use of roller bodies cages, but in which sensor and memory are provided in a single roller.

In an embodiment, the slew bearing comprises an inner main radial bearing provided between the stationary bearing ring and the moveable bearing ring on an inner side of the stationary bearing ring and/or an outer main radial bearing provided between the stationary bearing ring and the moveable bearing ring on an outer side of the stationary bearing ring.

In an embodiment, the inner main radial bearing and/or the outer main radial bearing are embodied as roller bearings comprising rollers arranged between a raceway on the moveable bearing ring and a raceway on the stationary bearing ring.

In an embodiment, the rollers of the inner main radial bearing and/or the outer main radial bearing are substantially held in position using an upper groove and a lower groove, wherein preferably the upper groove is provided in a cover element that is removable allowing for easy assembly. The upper and lower grooves are preferably arranged in the stationary bearing ring, but may alternatively be arranged on the moveable bearing ring.

The invention also relates to a hoisting crane comprising a crane structure, a slew platform supporting the crane structure, a base, and a slew bearing according to the invention, wherein the slew bearing is arranged between the base and the slew platform, wherein the stationary bearing ring is fixed to the base and the moveable bearing ring is fixed to the slew platform, thereby allowing the crane structure to rotate relative to the base about the rotation axis.

In an embodiment, the one or more main portions and the one or more auxiliary portions are fixed to the slew platform, wherein the one or more auxiliary portions can be disconnected from the slew platform, wherein an actuator is provided between auxiliary portions and the slew platform to lift the slew platform including the one or more main portions when the one or more auxiliary portions are disconnected from the slew platform thereby allowing to move the one or more main portions between the operational position and the raised maintenance position.

The invention also relates to a vessel comprising a hull provided with an opening extending vertically through the hull, a turret extending in the opening of the hull, and a slew bearing according to the invention, wherein the slew bearing is arranged between the hull and the turret, wherein the stationary bearing ring is fixed to the hull and the moveable bearing ring is fixed to the turret, thereby allowing the turret to rotate relative to the hull about the rotation axis.

In an embodiment, the one or more main portions and the one or more auxiliary portions are fixed to the turret, wherein the one or more auxiliary portions can be disconnected from the turret, wherein an actuator device is provided between auxiliary portions and the slew platform to lift the slew platform including the one or more main portions when the one or more auxiliary portions are disconnected from the slew platform thereby allowing to move the one or more main portions between the operational position and the raised maintenance position.

The invention also relates to a method comprising the following steps:
a) providing a slew bearing according to the invention with the one or more main portions being directly or indirectly connected to the one or more auxiliary portions with the one or more main portions in the operational position;
b) disconnecting the one or more main portions from the one or more auxiliary portions;
c) moving the one or more main portions to the raised maintenance position.

In an embodiment, the method further comprises the step of performing inspection and/or maintenance on the upper main axial bearing, and subsequently moving the one or more main portions to the operational position followed by connecting the one or more main portions to the one or more auxiliary portions.

In an embodiment, the one or more main portions and the one or more auxiliary portions are connected to a moveable object, e.g. a crane housing, wherein disconnecting the one or more main portions from the one or more auxiliary portions comprises disconnecting the one or more auxiliary portions from the moveable object, and wherein moving the one or more main portions to the raised maintenance position is carried out by providing an actuator device between the disconnected one or more auxiliary portions and moving the moveable object with the actuator device.

The slew bearing can also be summarized as follows:
A slew bearing comprising:
a stationary bearing ring to be fixed to a base;
a moveable bearing ring to be fixed to a moveable object and which moveable bearing ring is concentric with the stationary bearing ring;
an upper main axial bearing arranged between the stationary bearing ring and the moveable bearing ring to transfer axial loads between the moveable bearing ring and the stationary bearing ring;
an upper auxiliary axial bearing arranged between the stationary bearing ring and the moveable bearing ring to transfer axial loads between the moveable bearing ring and the stationary bearing ring,
wherein the stationary bearing and the moveable bearing ring are configured to enable rotation of the moveable bearing ring relative to the stationary bearing ring about a rotation axis,
wherein the upper auxiliary axial bearing is arranged parallel to the upper main auxiliary bearing,
wherein the slew bearing has an operational configuration in which the main part of the axial loads are transferred between the stationary bearing ring and the moveable bearing ring by the upper main axial bearing,
and wherein the slew bearing has a maintenance configuration in which at least a part of the upper main axial bearing is accessible for maintenance and/or inspection and in which the loss of bearing capacity of the upper main axial bearing is at least partially compensated for by the upper auxiliary axial bearing.

Alternatively, the slew bearing can be described as follows:
A slew bearing comprising:
a stationary bearing ring to be fixed to a base;
a moveable bearing ring to be fixed to an object and which moveable bearing ring is concentric with the stationary bearing ring,
wherein the stationary bearing ring and the moveable bearing ring are configured to enable rotation of the moveable bearing ring relative to the stationary bearing ring about a rotation axis,
wherein the slew bearing further comprises a row of axial load rollers, which rollers are arranged between a top roller raceway and a bottom roller raceway, said top roller raceway being connected to the moveable bearing ring and said bottom roller raceway being connected to the stationary bearing ring, and said rollers configured to transfer axial loads parallel to the rotation axis between the moveable bearing ring and the stationary bearing ring,
wherein the slew bearing further comprises low friction pads arranged on the moveable bearing ring and corresponding low friction pads arranged on the stationary bearing ring to engage with the low friction pads on the moveable bearing ring, wherein the low friction pads of the moveable bearing ring are arranged parallel to the top roller raceway, and the low friction pads of the stationary bearing ring are arranged parallel to the bottom roller raceway in order to be able to transfer axial loads parallel to the rotation axis between the moveable bearing ring and the stationary bearing ring,
characterized in that
at least a first portion of the moveable bearing ring comprising the top roller raceway, after being disconnected from a second portion of the moveable bearing ring comprising the low friction pads, is moveable relative to the second portion in a direction parallel to the rotation axis between an operational position in which the top roller raceway engages with the rollers and a raised maintenance position in which the top roller raceway is at a distance from the rollers to allow inspection and/or maintenance, wherein in case the first portion is in the raised maintenance position, the axial loads at the location of the first portion are transferred between the moveable bearing ring and the stationary bearing ring via the low friction pads on the second portion of the moveable bearing ring and the corresponding low friction pads on the stationary bearing ring.

In an embodiment, the invention provides a slew bearing ring that can be summarized as follows. The slew bearing has a rotational axis that extends in a substantially vertical direction, and the slew bearing comprises:
- a bottom bearing ring, i.e. the stationary bearing ring, the base bearing rig comprising a lower section of at least one raceway;
- a top bearing ring, i.e. the moveable bearing ring, which top bearing ring is concentric with said bottom bearing ring, wherein the top bearing ring comprises:
  - a main top bearing ring, i.e. the one or more main portions of the moveable bearing ring, which main top bearing ring comprises an upper section of the at least one raceway;
  - a secondary top bearing ring, i.e. the one or more auxiliary portions of the moveable bearing ring;
  - a row of main axial load rollers, i.e. the axial load rollers of the upper main axial bearing, which main axial load rollers are each provided between a top roller raceway received in the main top bearing ring and bottom roller raceway received in the bottom bearing ring, so as to enable rotation of the top bearing ring relative to the bottom bearing ring and transfer vertical loads from the main top bearing ring to the bottom bearing ring;
  - multiple lifting devices, i.e. the actuator device, which lifting devices are coupled with the main top bearing ring and the secondary top bearing ring, for moving the secondary bearing ring relative to the first bearing ring in a vertical direction between a working position, in which the secondary bearing ring is supported by the main bearing ring, and a lowered service position, in which the secondary bearing ring is supported by the base ring of the slew bearing, and for, when the secondary bearing ring is in the lowered service position, moving the main bearing ring relative to the secondary bearing ring in a vertical direction between a working position, in which the main baring ring is supported by roller bodies located in the at least one race way, and a lifted service position, i.e. the raised maintenance position, in which the main bearing ring is supported by the multiple lifting devices such that the roller bodies in the at least one race way are not loaded by the top of the at least one race way.

In a further embodiment the secondary top bearing ring in cross section has a substantially C-shaped section, and the base bearing ring has a circumferential flange, which circumferential flange is received in the C-shaped section of the secondary top bearing ring. in a further embodiment. the slew bearing further comprises a row of secondary axial load rollers, which secondary axial load rollers are each provided between a top roller raceway received in the bottom bearing ring and a bottom roller raceway received in the secondary bearing ring, so as to enable rotation of the top bearing ring relative to the bottom bearing ring and transfer vertical loads from the bottom bearing ring to the main top bearing ring. In an embodiment, the base bearing ring and/or the top bearing ring is/are provided with a bearing, preferably a slide bearing, i.e. a bearing comprising low friction pads, and wherein the secondary bearing ring is supported on that slide bearing when in the service position. In an embodiment, the top bearing ring is provided with one or more entry ports, which one or more entry ports provide access to the at least one raceway, and wherein the one or more entry ports are large enough for removing a roller body cage comprising multiple roller bodies from the raceway.

In an embodiment, the multiple lifting devices are configured to support the main top bearing ring in a service position that provides a gap between the main bearing ring and the base bearing ring, which gap is large enough for removing raceway liner segments and/or roller body cages from the at least one race way.

In an embodiment, the top bearing ring comprises multiple coupling elements, e.g. nuts and bolts, for coupling the main bearing ring and the secondary bearing, such that the main bearing ring and the secondary bearing ring are fixed relative to each other, when both the main bearing ring and the secondary bearing ring are in their respective working position. In an embodiment, the top bearing ring has a top wall, which top wall extends above the row of main axial load rollers and in which top wall is provided with at least one top entry port to allow access, from above, to the first row of axial load rollers.

In an embodiment, the top roller raceway of the row of main axial load rollers comprises a removable raceway segment releasable attached in the top entry port, which removable roller raceway segment can be removed from said top entry port to enable access via said top entry port to the first row of axial load rollers.

In a further embodiment, the top entry port and the removable raceway segment are dimensioned such that, when the removable roller raceway segment has been removed, via the top entry port axial load rollers can be removed in a substantially vertical direction from the first row of axial load rollers.

In an embodiment, the invention provides a roller bodies cage pushing device, i.e. a device configured for engaging a roller bodies cage via an entry port in a bearing, and for pushing that roller bodies cage along at least a section of the circumference of that bearing.

The invention also provides a system, comprising a slew bearing with one or more top entry ports and/or one or more side entry ports and at least one roller bodies cage pushing device.

In an embodiment the slew bearing comprises at least one roller body cage pushing devices, which at least one pushing device is configured to engage a roller body cage via the at least one service hatch and to push that roller body cage along the at least one raceway. Preferably, the roller bodies cage pushing device is a mobile device, which can be removed from the bearing when not in use and/or which can be switched between different entry ports.

In an embodiment, the pushing device is configured as a rear pushing device, i.e. is provided with a pushing member that is configured to be inserted into the raceway engages via an entry port, to engage the rear of a roller bodies cage located in that raceway, and to push that roller bodies cage, and thus a row of roller bodies cages, along a section of the circumference of the slew bearing. Such a pushing device requires at least one roller bodies cage to be removed from the raceway, to enable the pushing member to engage the rear of a roller bodies cage, since during normal use of the slew bearing the roller bodies cages are stacked front to rear in the raceway.

In an embodiment, the pushing device comprises one or more pusher blocks, which pusher blocks are inserted in the raceway to from an intermediate between the roller bodies cage to be pushed and the pushing device. Thus, the pusher block can be used as an interface that provides an optimal force distribution form the pushing member to the roller bodies cage, i.e. without peak pressures possibly damaging the roller bodies cage. Also, such a pusher block can be dimensioned such that it can be inserted into the raceway, i.e. the section of raceway adjacent the opening provided by the entry port, while the pushing member itself is not. Thus, the pushing member is operated in the opening provided by the entry port, and thus can be of a robust design since it does not need to be inserted into the raceway, i.e. the section of raceway adjacent the opening provided by the entry port, to push the roller bodies cage along said raceway.

Such a pushing device may for example comprise one or more cylinders or spindles that are to be inserted into the raceway in a retracted configuration, and which, once placed in the raceway, are extended to push a roller bodies cage along the raceway. In another embodiment, the pushing device comprise a hooked arm and/or hinge device that is inserted via the entry port into the raceway, and which is drive by a drive located outside the bearing to push at least part of the arm along a section of the circumference of the raceway to push a roller bodies cage along that raceway.

In an alternative embodiment, the pushing device is configured to be inserted into the raceway via the entry opening, and to engage the side of a roller bodies cage in that raceway, and to exert a pushing force onto that roller bodies cage via the side thereof. In such an embedment, the pusher body engages a roller bodies cage via an entry port, to engage the side of the roller bodies cage located in the raceway in front of the entry port, and to push that roller bodies cage, and thus a row of roller bodies cages, along a section of the circumference of the slew bearing. Such a pushing device is for example provided with driven wheels and/or tracks to engage the roller bodies cage and bush it along the raceway. In contrast with the embodiment discussed above, such a pushing device does not require at least one roller bodies cage to be removed from the raceway, to enable the pushing member to engage the rear of a roller bodies cage.

The invention furthermore provides a method for replacing, e.g. servicing, one or more roller bodies cages, i.e. roller body cages holing multiple axial load roller bodies, from a slew bearing, the method comprising the steps:

Lift the one or more main portions of the moveable bearing ring into the raised maintenance positon, such that the top roller raceway is disengaged from the axial load rollers of the upper main axial bearing;

open a first entry port and a second entry port that provide access to the axial load rollers of the upper main axial bearing;

Remove a roller bodies cage via the first entry port, and remove a roller bodies cage via the second entry port;

Insert a pushing device into the first entry port and push the row of roller bodies cages in the raceway along a section of the circumference of the slew bearing to thus position a subsequent roller bodies cage at the second entry port;

At least partially remove the pushing device, e.g. retract a pushing member of the pushing device, and insert a new roller bodies cage into the raceway via the entry port;

reinsert the pushing device, e.g. reinsert a pushing member of the pushing device, and push the newly inserted roller bodies cage, and thus the row of roller bodies cages in the raceway, along a section of the circumference of the slew bearing to thus position a subsequent roller bodies cage at the second entry port;

Remove the subsequent roller bodies cage via the second entry port;

At least partially remove the pushing device, e.g. retract a pushing member of the pushing device, and insert a new roller bodies cage into the raceway via the entry port;

Reinsert the pushing device, e.g. reinsert a pushing member of the pushing device, and push the new roller body cage, and thus the row of roller bodies cage bodies in the raceway, along a section of the circumference of the slew bearing to thus position a subsequent roller body cage at the second entry port;

Repeat one or more of the above mentioned steps until the roller bodies cages that need to be replaced and/or serviced are replaced and/or serviced;

close the first entry port and the second entry port and lower the one or more main portions of the moveable bearing ring into the operational positon, such that the top roller raceway engages the axial load rollers of the upper main axial bearing.

The invention provides a slew bearing with one or more top entry ports and/or one or more side entry ports to enable access to roller bodies cages in a raceway, which slew bearing furthermore comprises a moveable bearing ring that can be lifted to enable roller bodies cages to be pushed along the raceway, and thus enable positioning them before one or more entry ports to enable service, maintenance, check-up and/or replacement.

The invention allows for many alternative configurations. For example, in an embodiment the slew bearing is provided with one or more top entry ports and/or one or more side entry ports to be used for both pushing the roller bodies cages along the raceway and for replacing the roller bodies cages via that entry port.

In an alternative embodiment, the slew bearing is provided with multiple entry ports, of which multiple entry ports one or more entry ports are to be used for pushing the roller bodies cages and one or more entry ports are to be used for replacing the roller bodies cages.

In an alternative embodiment, the slew bearing is provided with multiple entry ports, of which multiple entry ports one or more entry ports are to be used for pushing and inserting roller bodies cages, and one or more entry ports are to be used for removing the roller bodies cages.

Alternative embodiments are also possible.

In an embodiment, the invention provides a slew bearing with multiple sections, e.g. four quarters, which sections are each provided with one or more top entry ports and/or one or more side entry ports and one or more actuators for lifting part of the moveable bearing ring, to enable servicing of the sections independently. Thus, each section, and the roller bodies cages located in that section, can be serviced while the other sections are in their working configuration, and thus transfer load from the moveable bearing ring to the stationary bearing ring.

A third aspect of the invention relates to an annular bearing assembly, which can for example be integrated in an annular slew bearing assembly in a hoisting crane, for example in a mast crane. Hoisting cranes of the latter type have already been commercially available from the applicant for decade.

Various bearings assemblies for such hoisting cranes are known, for example from WO2017045734 and EP2092204. However, the known bearings have disadvantages such as suboptimal distribution of forces, wear and fatigue, being complex to manufacture, and being cumbersome in maintenance.

It is an object of the third aspect of the invention to provide an improved or at least alternative annular bearing assembly.

This object is achieved with an annular bearing assembly according to claim 31.

Thus, the object of the third aspect of the invention is achieved with an annular bearing assembly comprising a lower ring and an upper ring, which upper ring comprises a first upper ring part and a second upper ring part. The upper ring is adapted to be moveable relative to the lower ring.

Preferably the lower ring is to be mounted stationary and in a horizontal plane, e.g. onto a column of a hoisting crane, and the upper ring is mounted to rotate about a rotation axis which extends vertically through a bearing centre of the bearing assembly. However, it is also possible for the upper ring to be stationary and the lower ring to rotate.

It is further envisaged for the bearing assembly to be used with the rotation axis of the bearing in vertical position. That is, said rotation axis is substantially vertical, and the annulus formed by the rings of the bearing assembly is in a substantially horizontal plane.

The lower ring comprises a protruding mating part, which is adapted to be arranged in a hollow mating part of the upper ring.

The bearing assembly preferably has, when seen in a transverse cross-section of the annulus, exactly one cage with one or two rollers therein, and three slide pads. The roller is arranged to carry the vertical downward forces, which is envisaged to be the vast majority of the overall forces exerted on the bearing assembly, since the bearing assembly is intended to be used with the rotation axis in vertical position and subjected to heavy vertical load.

The rollers are arranged in a circumferential series in a circumferential series of cages.

There is further a first slide pad which is absorbs vertical upward forces, but these forces are considerably less than the roller than those carried by the roller.

The bearing assembly further comprises a second and a third slide pad, which are each subjected to horizontal forces.

The inventors have found that particular arrangement of the lower ring and upper ring, in combination with the one cage and three slide pads in transverse cross-sectional view, results in an improved distribution of the forces among the components of the bearing assembly.

In the context of the third aspect of the invention, terms as "inner" and "inwards" are meant to mean closer to the bearing centre in the horizontal plane, while terms as "outer" and "outwards" are meant to mean further away from the bearing centre in the horizontal plane. Terms as "top", "above" and "higher" on the one hand, and "bottom", "under" and "lower" are meant to be interpreted in the conventional meaning, i.e. seen in vertical direction.

The third aspect of the invention further pertains to a method for assembling a bearing assembly according to the invention. Said method comprises the steps of:
  attaching a guide block on the bottom surface of the outer leg of the hollow mating part of the first upper ring part,
  arranging the first upper ring part on the lower ring, such that the protruding mating part of the lower ring is arranged in the hollow mating part of the first upper ring part, and the first upper ring part is supported by the rollers,
  detaching the guide block from the first upper ring part,
  attaching the second upper ring part on the bottom surface of the outer leg of the hollow mating part of the first upper ring part.

According to the third aspect of the invention, a guide block is provided during assembly. The guide block enables to avoid metal to metal contact during the arranging of the first upper ring part on the lower ring, thereby avoiding damage.

In a possible embodiment of the bearing assembly according to the third aspect of the invention, the second upper ring part consists of two half-annular parts, such that the two half-annular parts combined form the annular shape.

This embodiment advantageously simplifies the assembling of the bearing assembly, and can thus also be applied in the method according to the third aspect of the invention. Conventionally, the second upper ring part is manufactured as a single annular part. It must therefore be brought into an assembling position before the first upper ring part is arranged on the lower ring. Furthermore, it cannot be removed, e.g. for maintenance, without first dissembling the first upper ring part and the lower ring. With the second upper ring part according to this embodiment which consist of two half-annular parts, these parts can be brought from the side inwards under the first upper ring part when the first upper ring part is already arranged on the lower ring. Each of the parts can then be attached to each other and/or the first upper ring part. Similarly, the second upper ring part can also be removed to the side outwards, which simplifies maintenance.

Further advantageous embodiments are described in the dependent claims and in the following description with reference to the drawings. In the various drawings, like reference numbers are used to indicate like features.

The invention will now be described in a non-limiting way by reference to the accompanying drawings in which like parts are indicated by like reference symbols, and in which:

FIG. 12 shows a perspective view of a main portion of a moveable bearing ring and a stationary bearing ring, the main portion being in an operational position relative to the stationary bearing ring;

FIG. 13 shows a perspective view of the main portion of the moveable bearing ring and the stationary bearing ring of FIG. 12, the main portion being lifted in a raised maintenance position relative to the stationary bearing ring;

FIG. 17a-17b show alternative top views of a first pushing device according to the invention.

Figure 19:
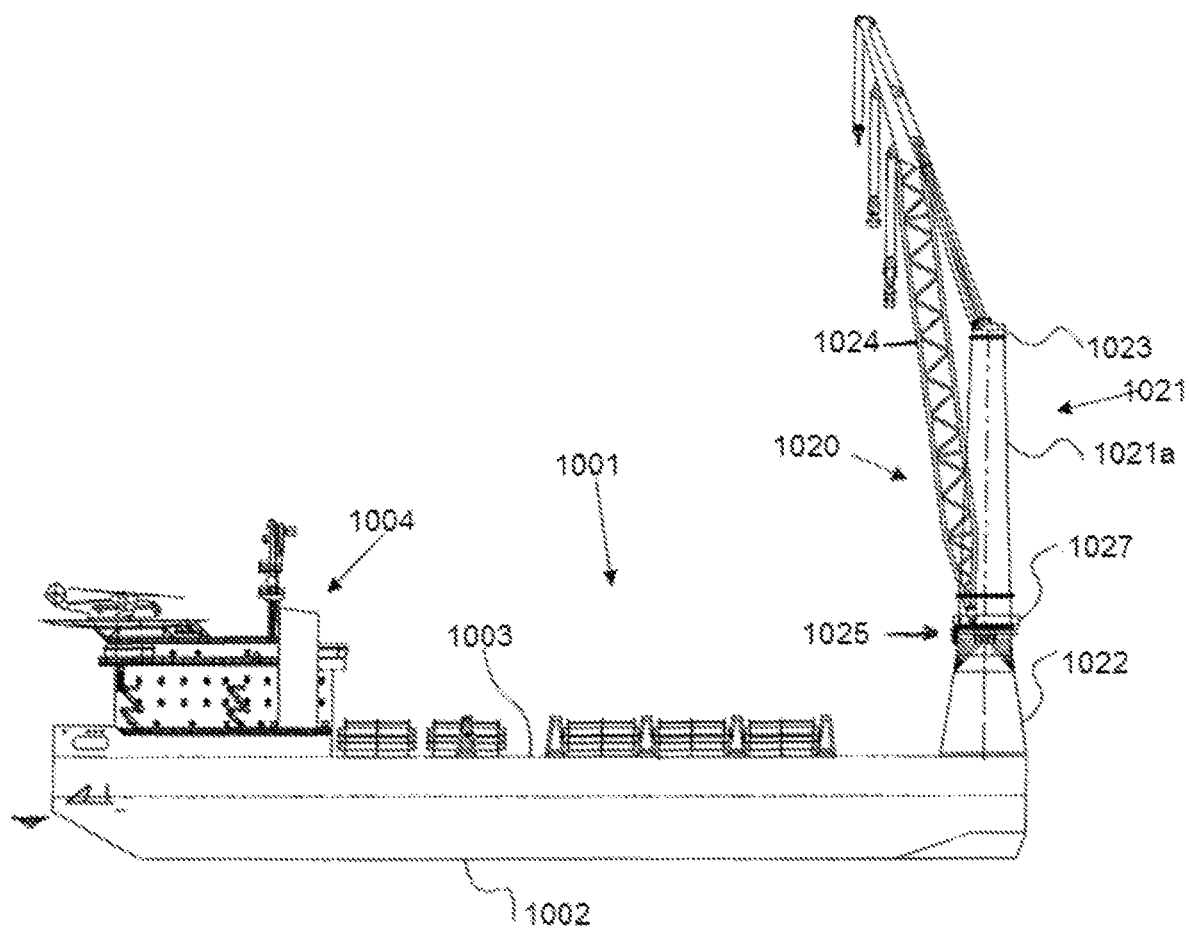
Figure 20:
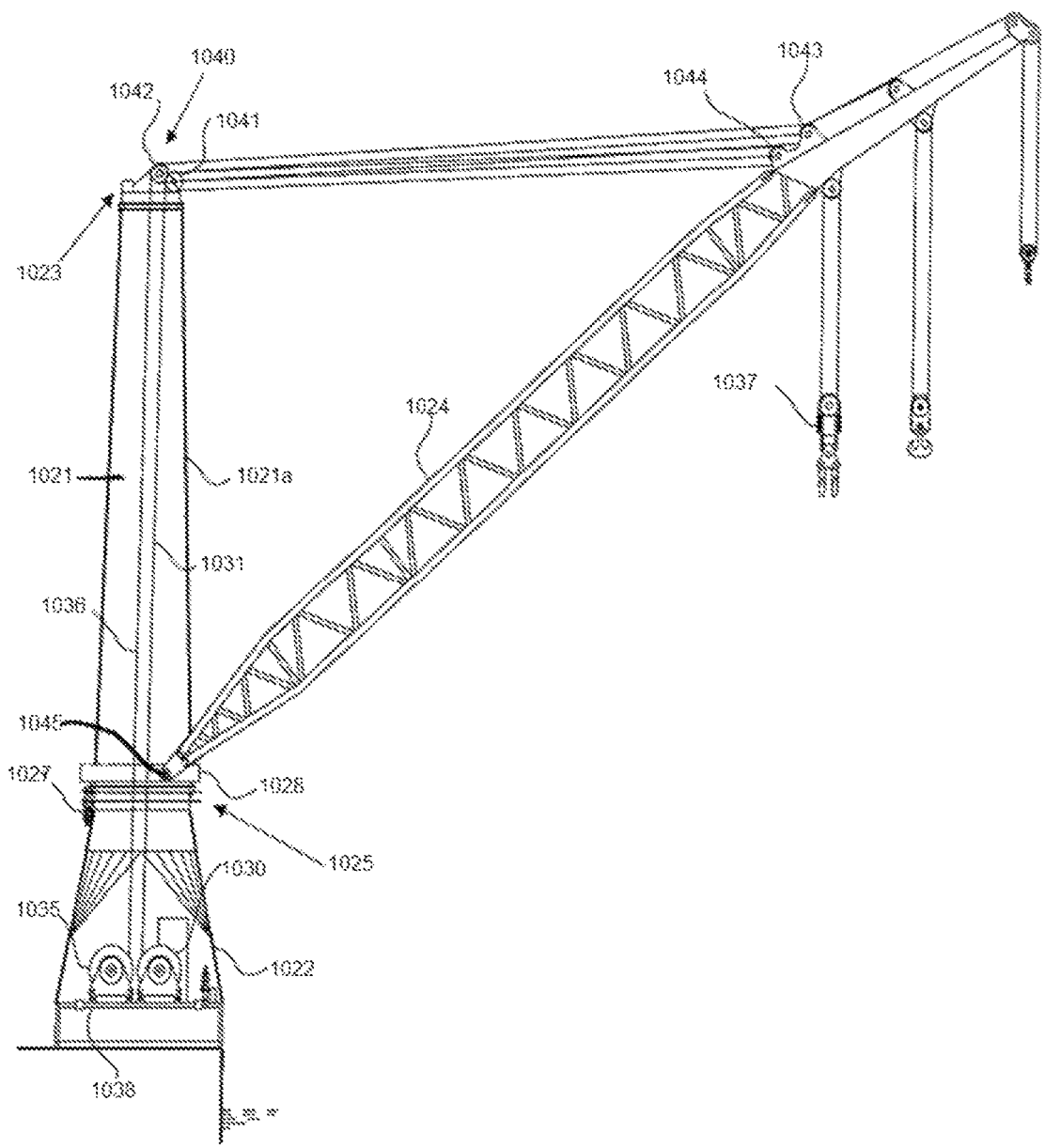
Figure 21:
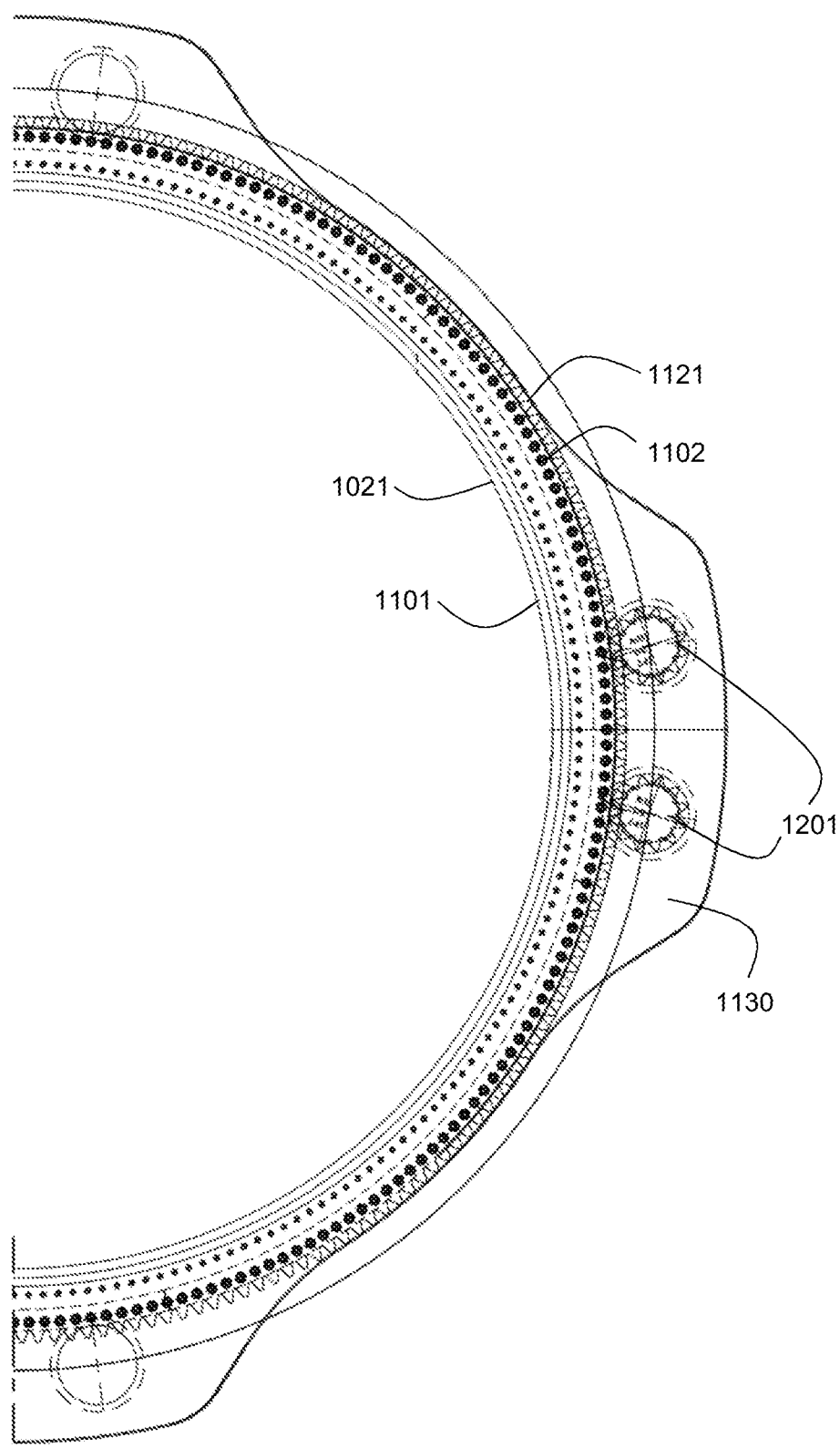
Figure 22:
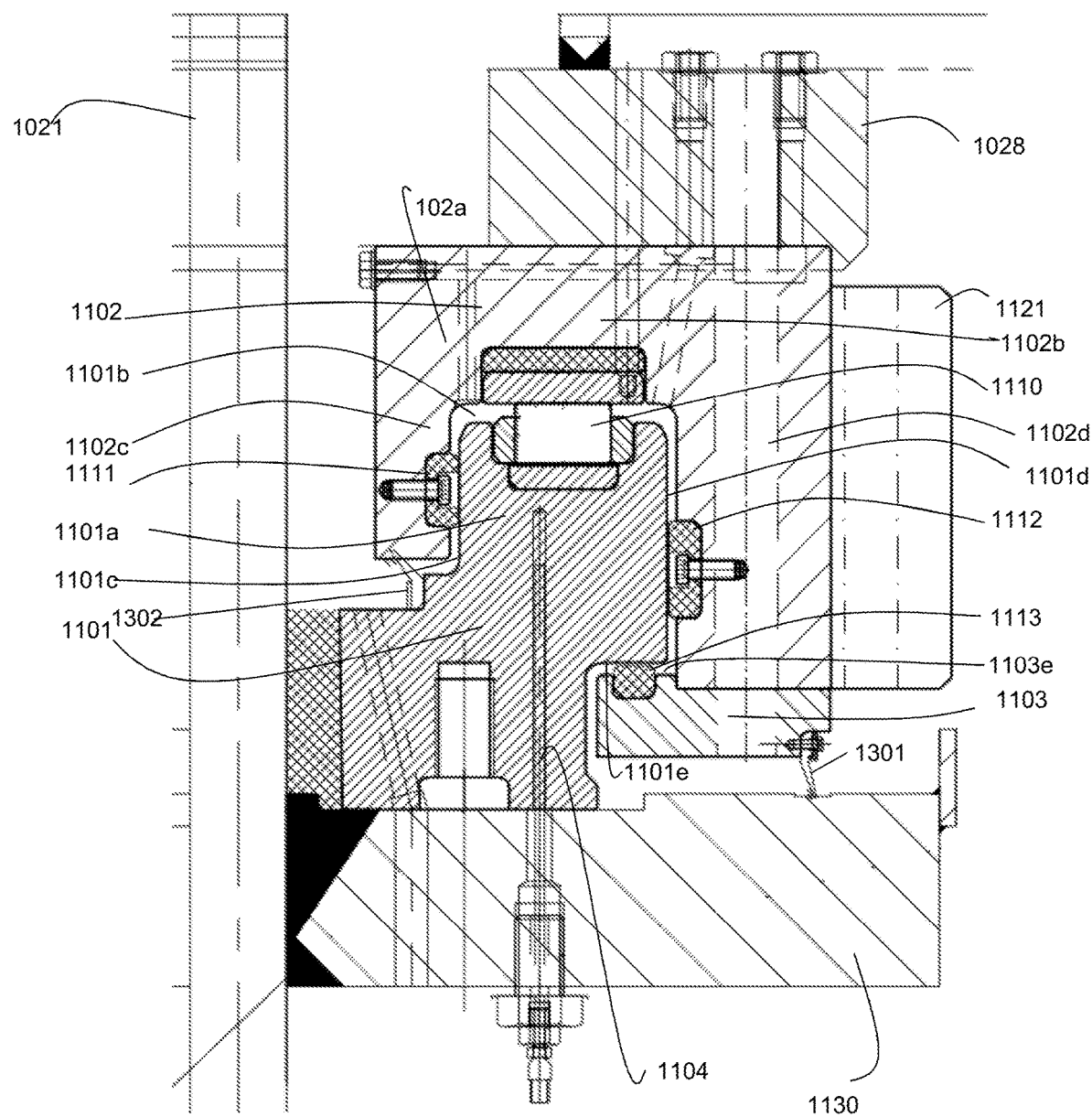
Figure 23A:
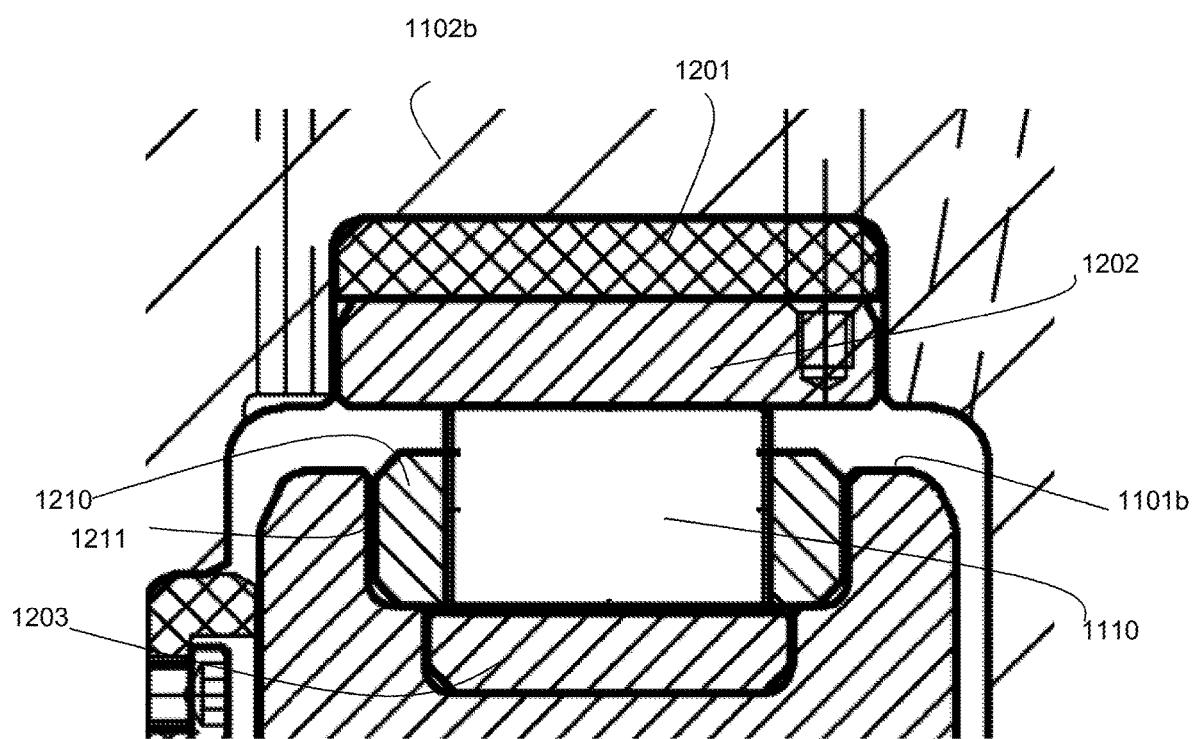
Figure 23B:
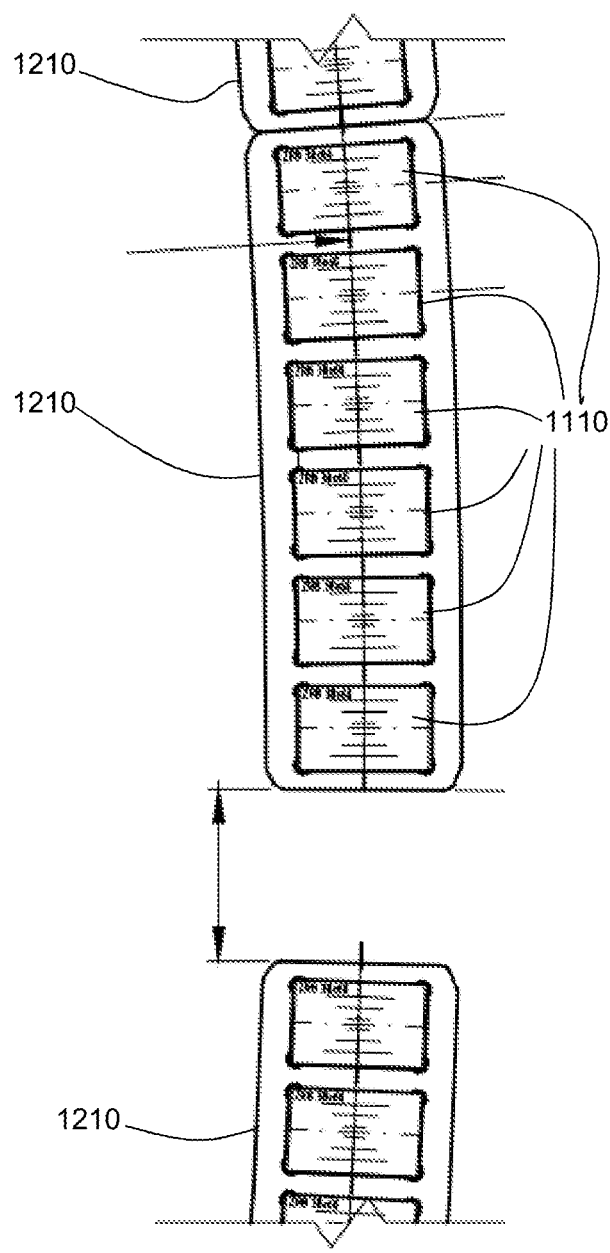
Figure 24:
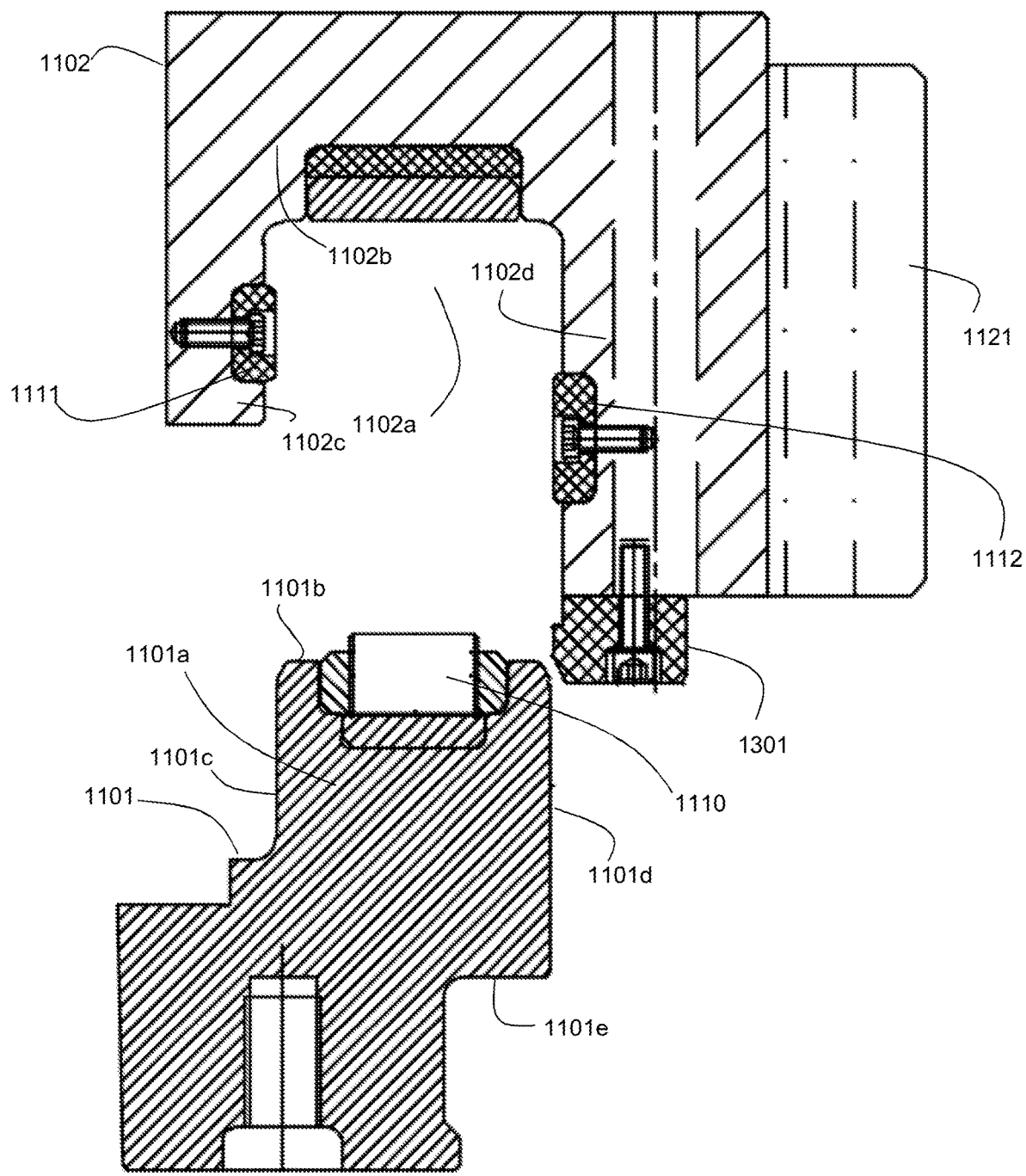

FIG. 19 diagrammatically depicts a vessel comprising a hoisting crane;

FIG. 20 shows a hoisting crane at the rear side of a vessel, partially in the form of a cut-away view;

FIG. 21 shows an annular bearing assembly according to the third aspect of the invention in top view FIG. 22 shows an a cross section of annular bearing assembly according to the third aspect of the invention arranged in a hoisting crane FIG. 23a shows a groove of a lower ring of a bearing assembly according to the third aspect of the invention, with therein arranged a cage comprising a roller FIG. 23b shows a top view of a plurality of cages comprising a plurality of rollers of a bearing assembly according to the third aspect of the invention FIG. 24 illustrates a method to assemble a bearing assembly according to the third aspect of the invention.

Whilst primarily presented for illustrative purposes with reference to one or more of the figures, any of the technical features addressed below may be combined with any of the independent claims of this application either alone or in any other technically possible combination with one or more other technical features.

Figure 1:
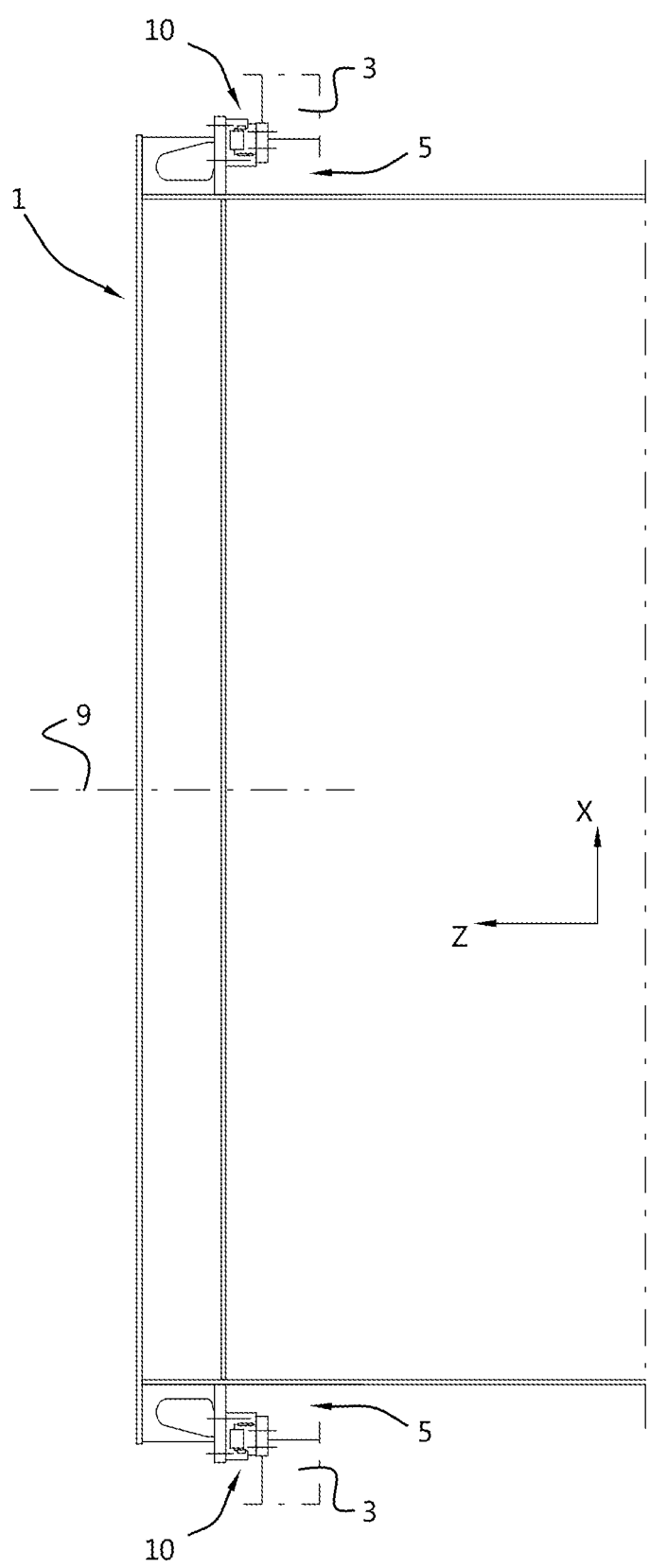
FIG. 1 depicts a cross section of a part of a vessel including a slew bearing according to an embodiment of the invention.

FIG. 1 depicts a part of a vessel 1 comprising a hull 3 with an opening 5 extending vertically through the hull 3. For clarity reasons, the drawing has been rotated 90 degrees such that the vertical extends parallel to the indicated Z-direction and the horizontal extends parallel to the indicated X-direction.

A turret 7 is provided in the opening 5 of the hull 3. Turrets are usually cylindrical elements generally used in floating production storage and offloading vessels. The vessel 1 is then equipped with hydrocarbon processing equipment for separation and treatment of crude oil, water and gasses, arriving on board from sub-sea oil wells via flexible pipelines connected to the turret.

The turret 7 can be moored to the seabed with chains, wires and anchors. A slew bearing 10 is provided between the hull 3 and the turret 7 to allow free and unrestricted 360° rotation of the vessel 1 around the turret 7. This allows weathervaning in which the vessel will normally lay head to the prevailing environment.

Figure 2:
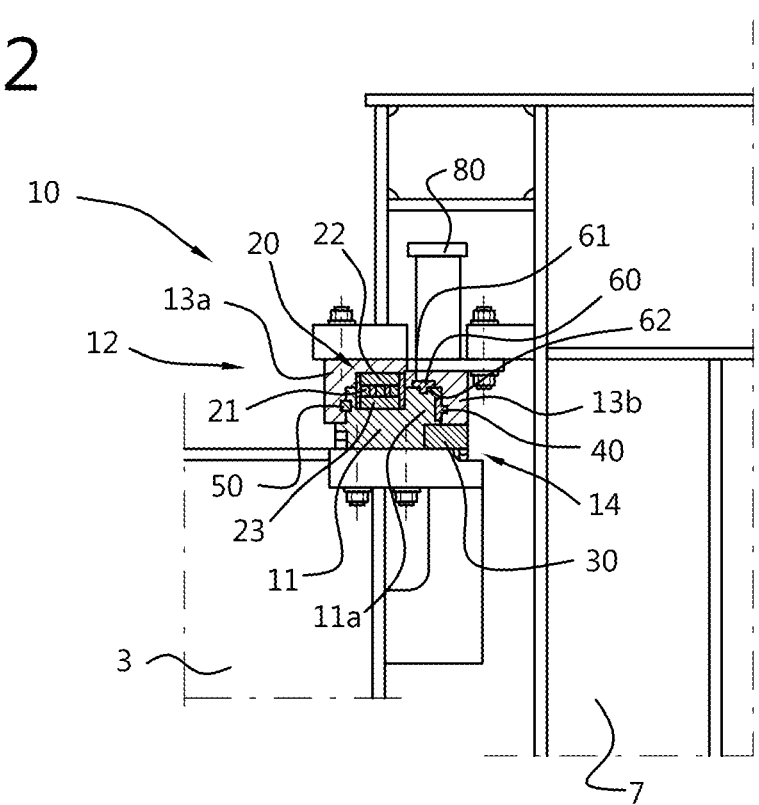
FIG. 2 depicts a cross section of the slew bearing of FIG. 1 during normal operation.

FIG. 2 depicts a cross section of the slew bearing 10 and part of the turret 7 and hull 3 during normal operation. The slew bearing 10 comprises a stationary bearing ring 11 fixed to the hull 3 which acts as base for the slew bearing 10. The slew bearing 10 further comprises a moveable bearing ring 12 fixed to the turret 7, which moveable bearing ring is concentric with the stationary bearing ring. The stationary bearing ring 11 and moveable bearing ring 12 are configured to enable rotation of the moveable bearing ring relative to the stationary bearing ring about a rotation axis 9 (see FIG. 1).

The slew bearing 10 comprises a number of bearings to transfer loads that act in different directions between the moveable bearing ring and the stationary bearing. One of the provided bearings is an upper main axial bearing 20 allowing to transfer axial loads from the moveable bearing ring to the stationary bearing ring caused by the weight of the moveable bearing ring and turret 7 connected thereto.

The slew bearing further comprises a lower main axial bearing 30 allowing to transfer axial loads between the stationary bearing ring and moveable bearing ring preventing the moveable bearing ring to disengage from the stationary ring.

In order to transfer radial loads between the moveable bearing ring 12 and stationary bearing ring 11, the slew bearing 10 is provided with an inner main radial bearing 40 and an outer main radial bearing 50.

The upper main axial bearing 20 comprises a row of axial load rollers 21, which rollers 21 are arranged between a top roller raceway 22 and a bottom roller raceway 23, the top roller raceway 22 being connected to the moveable bearing ring 12 and the bottom roller raceway 23 being connected to the stationary bearing ring 11. The use of the rollers 21 allows to transfer relatively high loads without too much wear and heat generation.

The lower main axial bearing 30 and the inner and outer radial bearings 40, 50 can be embodied as roller bearings or plain bearings in which low-friction pads are engaged with each other and able to slide relative to each other. Plain bearings are much simpler in construction and therefore preferred when the loads are relatively low.

Figure 3:
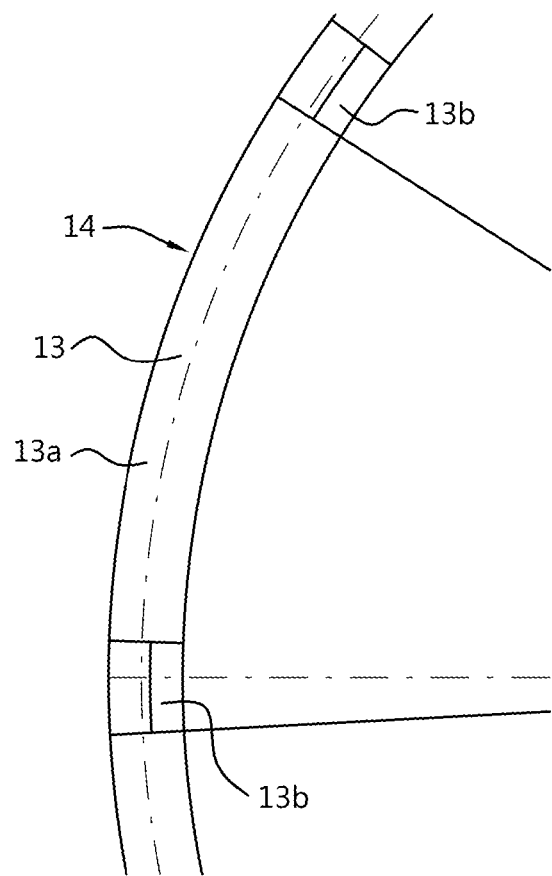
FIG. 3 depicts a schematic top view of a part of the slew bearing of FIG. 1.

In the particular embodiment shown, the moveable bearing ring 12 has a C-shaped cross section, comprising a top ring member 13, which can be best seen in FIG. 3 depicting a part of the slew bearing 10 from above, and a bottom ring member 14. The stationary bearing ring comprises a flange section 11a which extends in the radial direction, here, in the embodiment shown, the radially inward direction.

In this embodiment, the moveable bearing ring 12 comprises a main portion 13a as part of the top ring member 13 which includes the entire top roller raceway 22 of the upper main axial bearing 20.

The moveable bearing ring 12, in this case the top ring member 13 further comprises a plurality of auxiliary portions 13b distributed along the moveable bearing ring 12. The auxiliary portions 13b are provided with upper low-friction pads 61 as part of an upper auxiliary axial bearing 60. Corresponding lower low-friction pads 62 are arranged on the stationary bearing ring.

The upper auxiliary axial bearing 60 is provided in parallel to the upper main axial bearing 20 and also able to transfer axial loads between the moveable bearing ring and stationary bearing ring when the upper low-friction pads and lower low-friction pads engage with each other.

In this embodiment, during normal operation as shown in FIG. 2, the auxiliary portions 13b and the main portion 13a are connected to the turret 7 such that the main part of the axial loads is transferred between the moveable bearing ring and stationary bearing ring via the upper main axial bearing 20.

Figure 4:
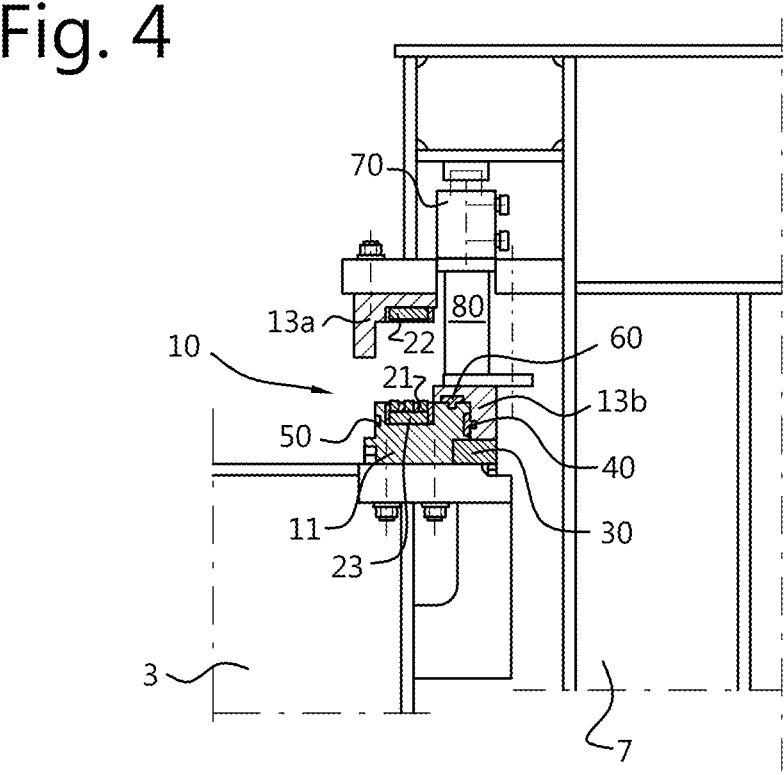
FIG. 4 depicts the cross section of FIG. 2 during maintenance or inspection.

The advantage of the auxiliary portions 13b and the upper auxiliary axial bearing will be apparent by reference to FIG. 4. In this FIG. 4, the auxiliary portions 13b have been disconnected from the turret 7 and an actuator device 70, e.g. a hydraulic jack system, is provided between the auxiliary portions 13b and the turret 7. By actuating the actuator device 70 it is possible to lift the turret 7 relative to the auxiliary portions 13b. Due to the fact that the main portion 13a is still connected to the turret, lifting the turret 7 will also lift the main portion 13a including top roller raceway 22 and allow access to the rollers 21.

In other words, the main portion 13a is moveable relative to the auxiliary portions 13b between an operational position as shown in FIG. 2, in which the top roller raceway of the main portion engages with axial load rollers to transfer axial loads between the moveable bearing ring and the stationary ring, and a raised maintenance position as shown in FIG. 4, in which the top roller raceway is disengaged from the axial load rollers.

In the raised maintenance position of the main portion 13a, the upper auxiliary axial bearing 60 will then take over the transfer of the axial loads between the moveable bearing ring and the stationary ring, so that the turret is still able to rotate relative to the hull. In other words, inspection and maintenance can be performed while the slew bearing is still fully functional albeit that it may be preferred to carry out inspection and/or maintenance during relatively mild and quiet weather conditions.

Depending on the available space and the dimensions of the actuator device 70 additional support elements may be used. In the embodiment of FIGS. 1-4, a support element 80 is provided on the auxiliary portions 13b for the actuator device 70 to reduce the available space between auxiliary portions and frame elements of the turret 7, thereby allowing to use a smaller actuator device.

As indicated by the FIGS. 2 and 4, the actuator device does not necessarily have to be provided permanently. It is well possible that during normal operation the actuator devices are not present and only installed when inspection and/or maintenance is required.

Although the invention has been described by reference to FIGS. 1-4 in which the slew bearing according to the invention is arranged between a turret and a hull of a vessel, it will be apparent that the invention can be used in many applications where a structure needs to be rotatable about a substantially vertical rotation axis. An example of such another application is a hoisting crane as shown in FIG. 5.

Figure 5:
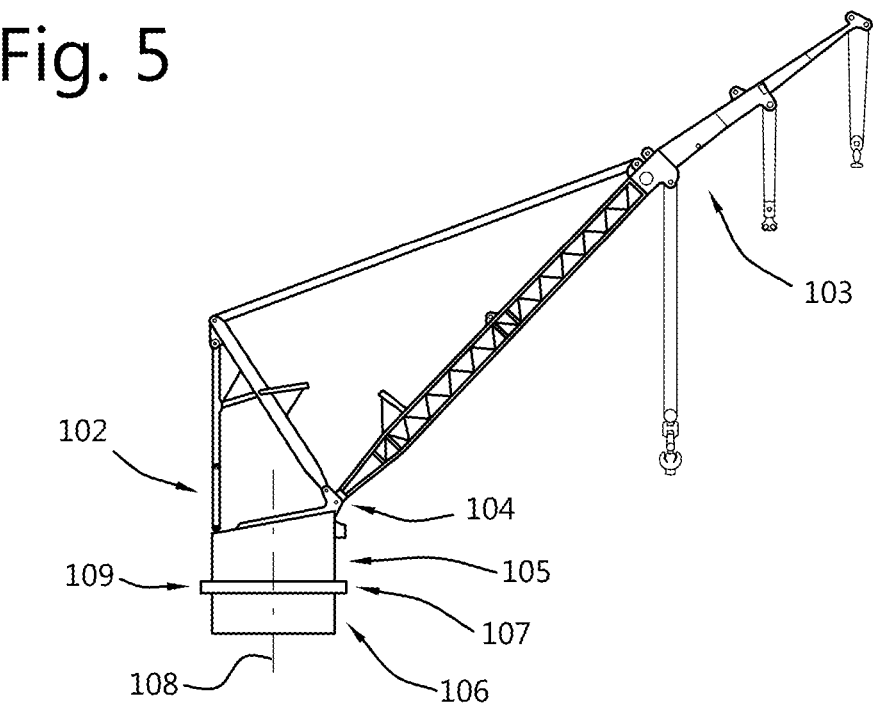
FIG. 5 depicts a hoisting crane according to an embodiment of the invention.

FIG. 5 shows a side view of a hoisting crane. The hoisting crane comprises a crane structure 102, which crane structure comprises a jib 103. In the embodiment shown, the jib 103 can be pivoted about a substantially horizontal pivot axis 104.

The crane structure 102 further comprises a crane housing 105 with a slew platform 109 at a lower side thereof. To support the crane structure 102 including crane housing 105, a base 106 is provided, which base can be secured to a vessel. To enable rotation of the crane structure 102 about a vertical axis, the hoisting crane is provided with a slew bearing 107 between the base 106 and the slew platform 109. The slew bearing 107 has a rotational axis 108 that extends in a substantially vertical direction and allows the slew platform 109, and thus the crane structure 102 comprising the jib 103, to be rotated relative to the base 106 about that rotational axis 108.

The slew bearing 107 can be similarly embodied as the slew bearing of FIGS. 1-4, with the difference that the moveable bearing ring is fixed to the slew platform 109 instead of the turret.

Figure 6:
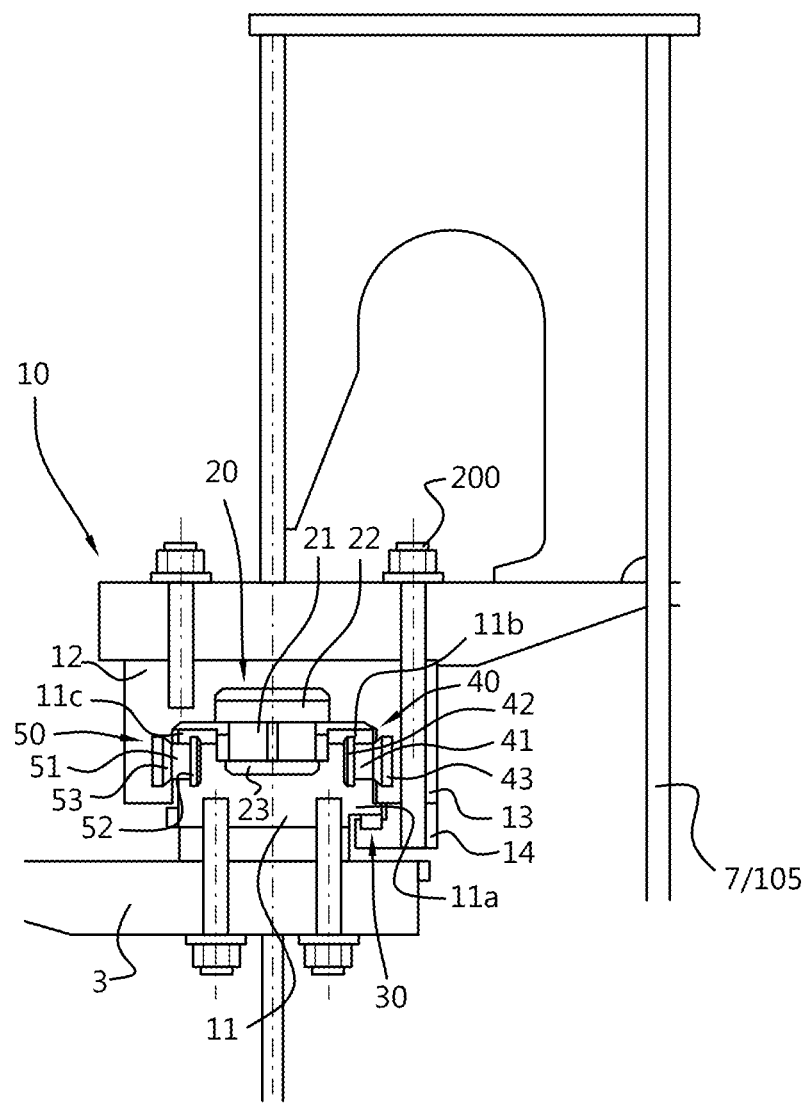
FIG. 6 depicts a cross section of a part of a vessel including a slew bearing according to another embodiment of the invention.

FIG. 6 depicts a cross section of a vessel with a slew bearing 10 according to another embodiment of the invention. The slew bearing 10 comprises a stationary bearing ring 11 fixed to a hull 3 of the vessel, which hull 3 acts as base for the slew bearing 10. The slew bearing 10 further comprises a moveable bearing ring 12 fixed to a turret 7 or slew platform 105 of a crane, which moveable bearing ring 12 is concentric with the stationary bearing ring 11. The stationary bearing ring 11 and the moveable bearing ring 12 are configured to enable rotation of the moveable bearing ring 12 relative to the stationary bearing ring 11 about a rotation axis.

The slew bearing 10 comprises a number of bearings to transfer loads that act in different directions between the moveable bearing ring 12 and the stationary bearing ring 11. One of the provided bearings is an upper main axial bearing 20 allowing to transfer axial loads from the moveable bearing ring 12 to the stationary bearing ring 11 caused by the weight of the moveable bearing ring 12 and structure 7 or 105 connected thereto.

The slew bearing further comprises a lower main axial bearing 30 allowing to transfer axial loads between the stationary bearing ring 11 and the moveable bearing ring 12 preventing the moveable bearing ring 12 to disengage from the stationary bearing ring 11.

In order to transfer radial loads between the moveable bearing ring 12 and the stationary bearing ring 11, the slew bearing 10 is provided with an inner main radial bearing 40 and an outer main radial bearing 50.

The upper main axial bearing 20 comprises a row of axial load rollers 21, which rollers 21 are arranged between a top roller raceway 22 and a bottom roller raceway 23, the top roller raceway 22 being connected to the moveable bearing ring 12 and the bottom roller raceway 23 being connected to the stationary bearing ring 11. The use of the rollers 21 allows to transfer relatively high loads without too much wear and heat generation.

The lower main axial bearing 30 can be embodied as roller bearings as well, but are in this embodiment embodied as plain bearings in which low-friction pads are engaged with each other and able to slide relative to each other. Plain bearings are much simpler in construction and therefore preferred when the expected loads are relatively low.

In the particular embodiment shown, the moveable bearing ring 12 has a C-shaped cross section, comprising a top ring member 13 and a bottom ring member 14. The stationary bearing ring 11 comprises a flange section 11a which extends in the radial direction, here, in the embodiment shown, the radially inward direction.

In this embodiment, the inner radial bearing 40 is embodied as a roller bearing comprising a row of radial load rollers 41, which rollers 41 are arranged between a first raceway 42 and a second raceway 43, wherein the first raceway 42 is connected to the stationary bearing ring 11 and the second raceway 43 is connected to the moveable bearing ring 12, in this case the top ring member 13 thereof.

In this embodiment, the out radial bearing 50 is embodied as a roller bearing comprising a row of radial load rollers 51, which rollers 51 are arranged between a first raceway 52 and a second raceway 53, wherein the first raceway 52 is connected to the stationary bearing ring 11 and the second raceway 53 is connected to the moveable bearing ring 12, in this case the top ring member 13 thereof.

As both the inner and outer radial bearings 40, 50 are embodied as roller bearing including rollers of which the respective rotation axes are oriented substantially vertical, there is the risk of rollers falling out of their intended position during assembly and maintenance. This has been solved in this embodiment by providing a respective removable cover element 11b, 11c. The rollers are then retained by the respective cover element 11b, 11c and a corresponding other portion of the stationary bearing ring 11, e.g. opposite the cover element 11b, 11c, to prevent them from inadvertently falling out of the stationary bearing ring 11. The cover portions 11b, 11c being removable allows for easy assembly and removal of the rollers in case of maintenance. As is preferred, the rollers may be provided with axial protrusions being received in corresponding recesses or grooves of said cover element 11b, 11c and said other portion of the stationary bearing ring 11. The recesses or grooves in the cover elements 11b, 11c may be referred to as upper grooves and the recesses or grooves in the other portion of the stationary bearing ring 11 may be referred to as lower grooves.

FIG. 6 depicts a cross section of the slew bearing 10 at a location where the entire top ring member 13 is made of one piece and connected to the bottom ring member 14 via bolts 200. This connection may not be intended to be released during regular maintenance. For regular maintenance there are maintenance sections provided, e.g. distributed along the entire circumference of the slew bearing, allowing to get access to the upper main axial bearing 20. A cross section of the slew bearing at such a maintenance section is depicted in FIG. 7 for an operational situation and in FIG. 8 for a maintenance situation.

At the maintenance sections, the moveable bearing ring 12 comprises a main portion 13a as part of the top ring member 13 which includes the top roller raceway 22 of the upper main axial bearing 20. The moveable bearing ring 12, in this case the top ring member 13 further comprises an auxiliary portion 13b. The auxiliary portion 13b is provided with upper low-friction pads 61 as part of an upper auxiliary axial bearing 60. Corresponding lower low-friction pads 62 are arranged on the stationary bearing ring 11. In this example, the cover element 11b also comprises the lower low-friction pads 62.

The upper auxiliary axial bearing 60 is provided in parallel to the upper main axial bearing 20 and also able to transfer axial loads between the moveable bearing ring 12 and the stationary bearing ring 11 when the upper low-friction pads 61 and lower low-friction pads 62 engage with each other.

Figure 7:
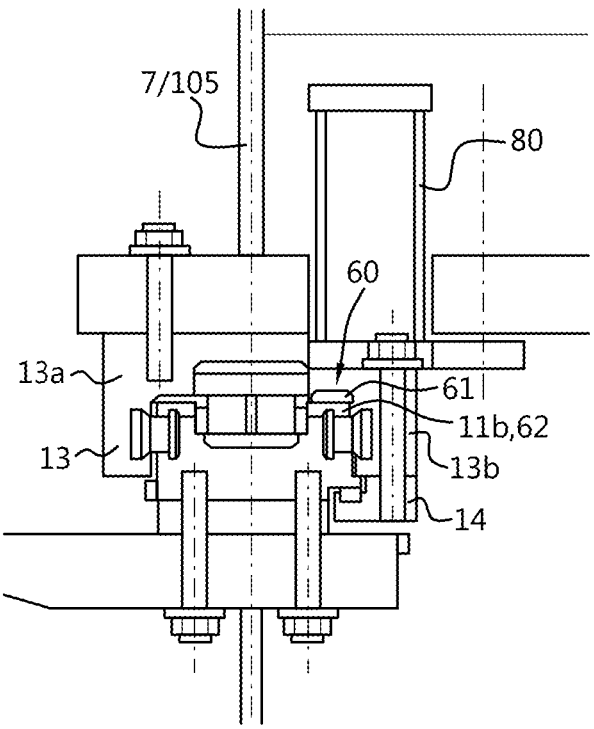
FIG. 7 depicts a cross section of the slew bearing of FIG. 6 during normal operation.

In the operational situation shown in FIG. 7, the main portion of the axial loads is transferred between the moveable bearing ring 12 and the stationary bearing ring 11 via the upper main axial bearing 20 shown in FIGS. 6 and 7.

Figure 8:
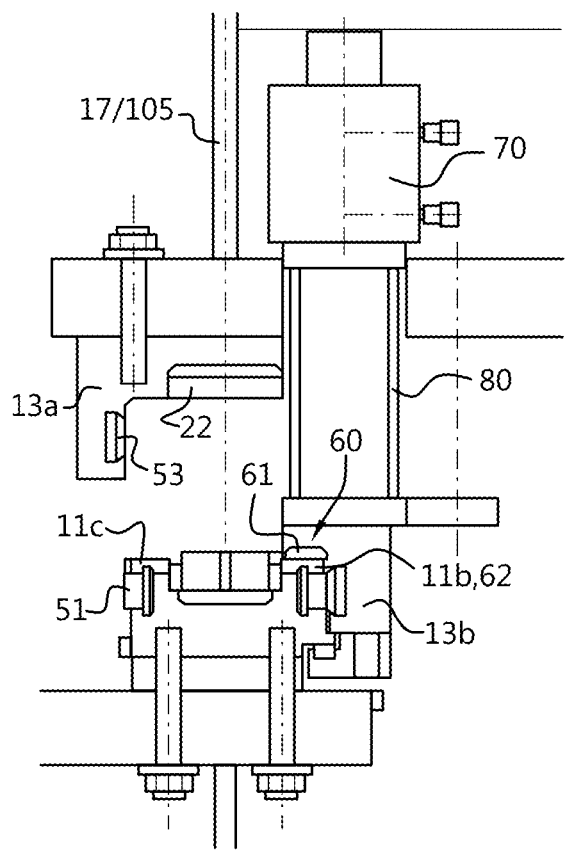
FIG. 8 depicts the cross section of FIG. 7 during maintenance or inspection.

In the maintenance situation shown in FIG. 8, the turret 7 or the slew platform 105 of a crane is lifted with respect to the auxiliary portion 13b using an actuator device 70, e.g. a hydraulic system, between the auxiliary portion 13b and the turret 7 or the slew platform 105. Due to the fact that the main portion 13a is still connected to the turret 7 or the slew platform 105, lifting the turret 7 or the slew platform 105 will also lift the main portion 13a including the top roller raceway 22 and allow to access the rollers 21.

In other words, the main portion 13a is moveable relative to the auxiliary portion 13b between an operational position as shown in FIG. 7, in which the top roller raceway of the main portion engages with axial load rollers to transfer axial loads between the moveable bearing ring and the stationary ring, and a raised maintenance position as shown in FIG. 8, in which the top roller raceway is disengaged from the axial load rollers.

In the raised maintenance position of the main portion 13a, the upper auxiliary bearing 60 will then take over the transfer of the axial loads between the moveable bearing ring and the stationary ring, so that the turret 7 or the slew platform 105 is still able to rotate relative to the hull of the vessel. In other words, inspection and maintenance can be performed while the slew bearing is still fully functional albeit that it may be preferred to carry out inspection and/or maintenance during relatively mild and quiet weather conditions.

Depending on the available space and the dimensions of the actuator device 70 additional support elements may be used. An example of such a support element 80 is depicted in the FIGS. 7 and 8 to reduce the available space between the auxiliary portion 13b and the frame elements of the turret 7 or the slew platform 105, thereby allowing to use a smaller actuator device 70.

In this embodiment it is assumed that at the sections depicted in FIG. 6, the top ring member 13 stays connected to the lower ring member 14, so that lifting the turret 7 or the slew platform 105 requires the turret 7 or the slew platform 105 to be temporarily be disconnected from the top ring member 13. In that case the top ring member 13 portion of FIG. 6 may be connected to the auxiliary portion 13b. However, in an alternative embodiment, the top ring member 13 stays connected to the turret 7 or the slew platform 105, so that the connection between the top ring member 13 and the lower ring member 14 needs to be disconnected to allow the turret 7 or the slew platform 105 to be lifted. In that case, the top ring member 13 portion of FIG. 6 may be connected to the main portion 13a. An advantage of the latter embodiment is that access is obtained to all rollers at once.

As shown in FIG. 8, lifting the main portion 13a also disengages the raceway 53 from the rollers 51. In absence of the raceway 53, the rollers 51 are kept in position by cover element 11c.

FIGS. 9a-9f each show a perspective view of a section of a slew bearing 107 in which a top entry port 118 is provided. It is submitted that the moveable bearing ring 112 comprises a main portion 113a, with the top roller raceway of the upper main axial bearing 120 and the top entry port 118, and a corresponding auxiliary portions 113b, comprising a part of the upper low-friction pads of a lower main axial bearing 130. The configuration of the moveable bearing ring is thus similar to the moveable bearing ring depicted in FIGS. 2 and 4. The series of FIGS. shows the subsequent steps involved with removing the roller bodies cage, or roller box 135, from the slew bearing 107. First, the hatch 194 is detached from the moveable bearing ring 112, and is subsequently lifted and removed from the top entry port 118, which process is shown in FIGS. 5a, 5b and 5c respectively. After the hatch 194 has been removed, a filler element 193, a raceway element 191 and a liner element 192 are lifted from the top entry port and removed, which is depicted in FIG. 5d.

The moveable bearing ring 117 shown, in particular the main portion 13a of the moveable bearing ring, is depicted in its operational positon only. Preferably, the main portion is lifted into its raised maintenance position prior to the entry port being opened, and is only lowered into its operational position after the entry port has been closed.

Once the entry port, and in this case the additional components, have been removed to provide entry to the raceway, a pushing device can be installed to push the roller bodies cages in the raceway along at least a section of the slew bearing.

In an embodiment, the slew bearing is provided with a single entry port, which is used for both replacing the roller bodies cages and for pushing the roller bodies cages.

In a preferred embodiment, the slew bearing is provided with multiple entry ports, for example with two entry ports of which one is used to push the roller bodies cages along the raceway using a pushing device and another is used for replacing the roller bodies cages. In such an embodiment, the a roller bodies cage is removed and checked, and if needed is replaced with another roller bodies cage. Once the roller bodies cage, or its replacement has been inserted, the pushing device pushes the row of roller bodies cages along the raceway until another roller bodies cage is aligned with the entry port to be checked and possibly replaced.

In an alternative embodiment, the at a first entry port a roller bodies cage is removed to enable a pushing device to insert a pushing member into the raceway and push the row of roller bodies cages along the raceway to align subsequent roller bodies cages at a second entry port. Thus, with each push, the row of roller bodies cages is advanced over the length of an entry port, which length of the entry port matches with at least the length of a roller bodies cage to enable removal of a roller bodies cage via the entry port.

Once the row of roller bodies cages has been advanced over the length of at least on roller bodies cage, at the second entry port, a roller bodies cage is lifted out of the raceway for inspection and possible replacement, and at the first entry port a roller bodies cage is inserted into the raceway, after which the pushing device can again push the row of roller bodies cages along the raceway.

Figure 9A:
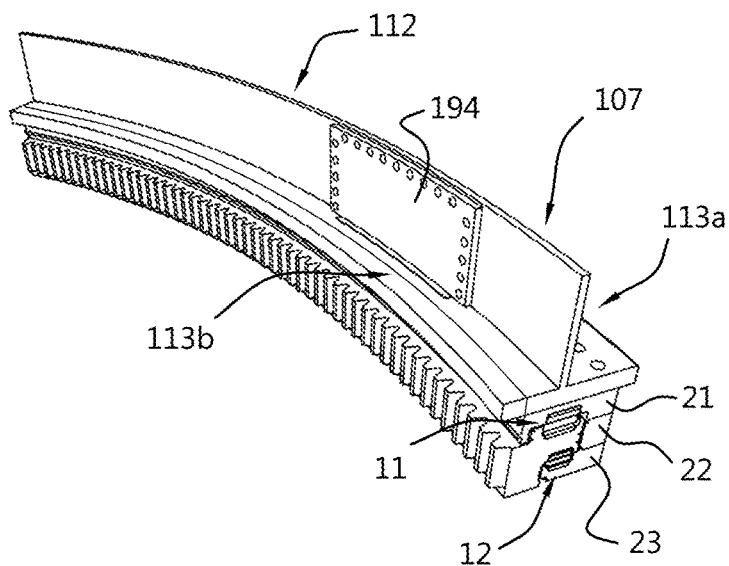
FIG. 9a-9e show subsequent steps involved with removing a roller bodies cage, or roller box, with axial load rollers via a top entry port.
Figure 9B:
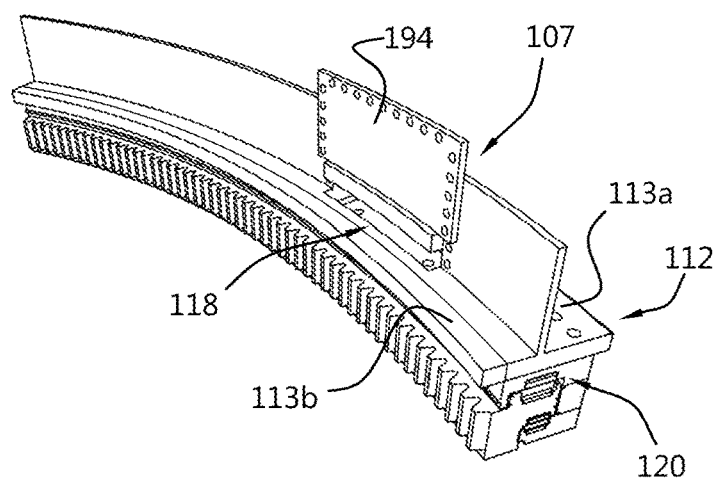
Figure 9C:
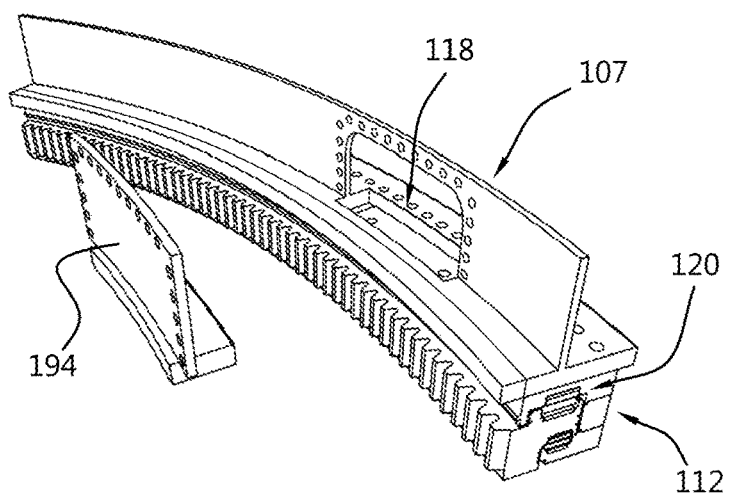
Figure 9D:
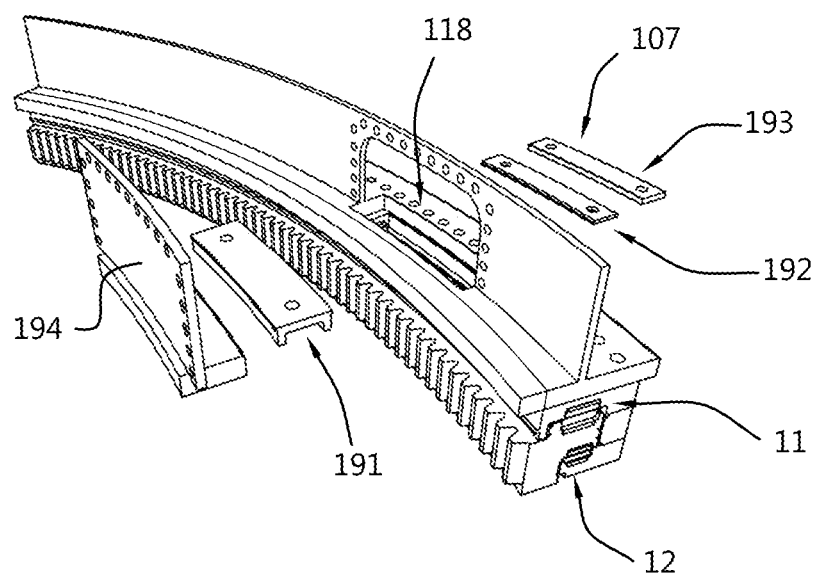
Figure 9E:
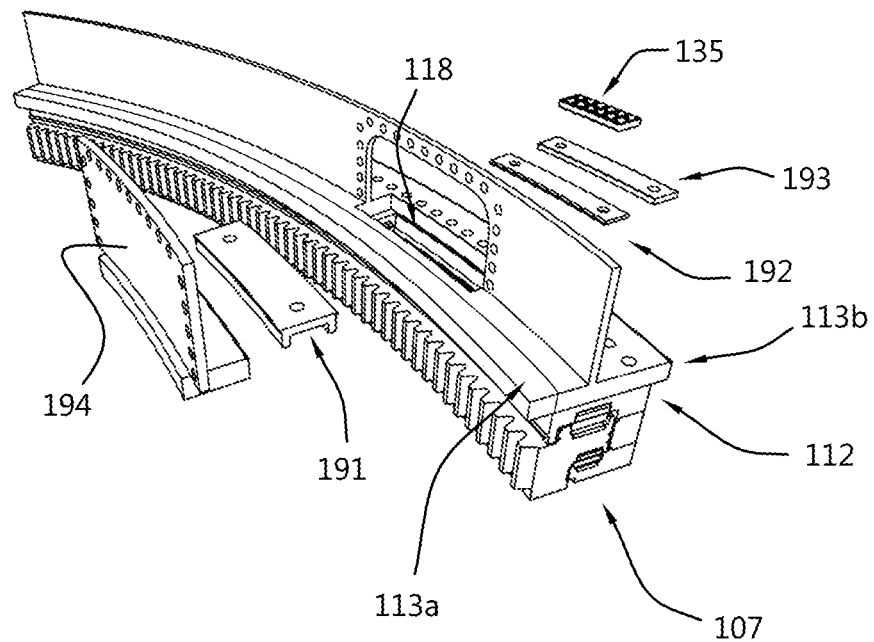
Figure 10A:
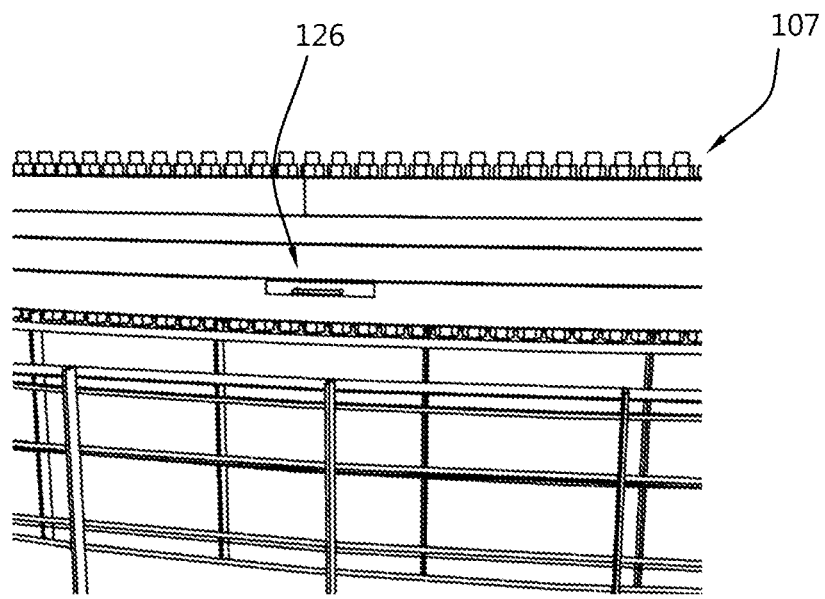
FIG. 10a-10d show subsequent steps involved with removing a roller bodies cage, or roller box, with axial load rollers via a side entry port.
Figure 10B:
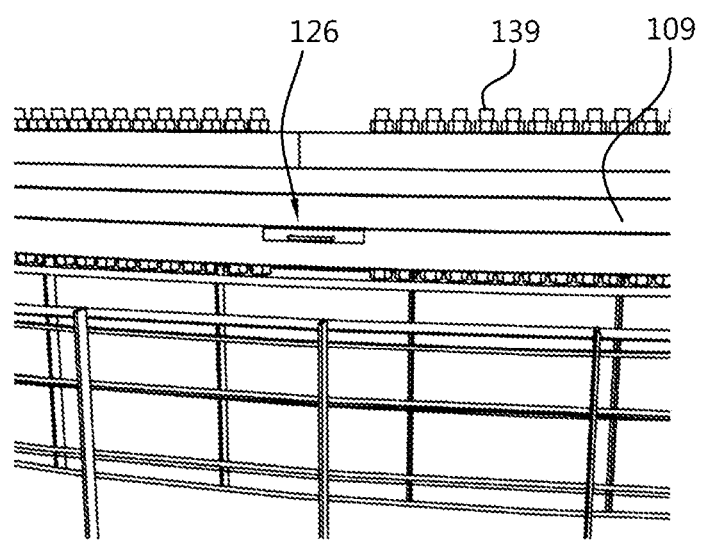
Figure 10C:
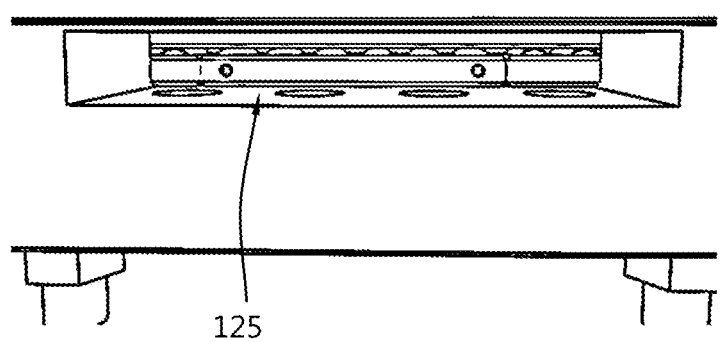
Figure 10D:
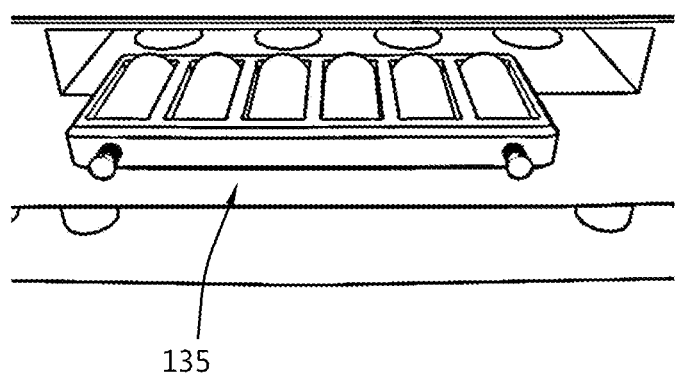

FIG. 9e shows the roller bodies cage 35 lifted from its location in the raceway in the slew bearing 107. After the roller bodies cage has been removed, the elements, i.e. roller bodies cage and roller bodies, can be thoroughly inspected and replaced with new ones if required.

It is submitted that with a slew bearing according to the invention, the main portions of the moveable slew bearing do only need to be lifted to an extend that the roller bodies are disengaged, and the roller bodies cages can be freely pushed along the raceway. Thus, the raised maintenance position of the main portions of the moveable bearing ring only needs to be a little distance above the operational position, for example several centimetres. Thus, the actuator device for lifting the main portions can be limited in size and performance.

In a further embodiment, the actuator for lifting the main portions is configured to lift the main portions of the moveable bearing ring into a second, raised maintenance position, in which the main portions are lifted high enough to allow access to the raceway via gap between the main portions of the moveable bearing ring and the stationary bearing ring. In such an embodiment, the full raceway can be accessed and for maintenance. For example, the raceway can be provided with removable raceway elements and/or liner elements that can be replaced. Thus, the raceway can also be refurbished via the gap between the moveable bearing ring, or at least the main portions thereof, and the stationary bearing ring. thus, the bearing does not need to be disassembled and service and inspection of the slew bearing can be performed at location.

In the particular embodiment shown in the FIGS. 9a-9e the moveable bearing ring 107 has a circumferential side wall 124, which side wall extends along the axial load rollers and guides these axial load rollers in a circumferential direction. in an embodiment, the side wall is provided with at least one side entry port 125 configured to allow access, in a lateral direction, to the roller bodies cages holding the axial load rollers.

FIGS. 10a-10d show a perspective view of part of the slew bearing 107 in which a side entry port 125 is provided. The side entry port can be provided in moveable bearing ring, preferably in a main portion thereof, or in the stationary bearing ring.

The side entry port 125 is provided with a removable insert 126. The removable insert 126 has a guide surface 127 that is part of the circumferential side wall 124 in which the entry port 125 is provided. The guide surface 127 of the insert is configured for guiding the axial load rollers of the upper main axial bearing in the circumferential direction. Therefore, the insert is either provided with a surface fit for guiding the axial load rollers, or the roller bodies cages, or can be provided with guides, such as low friction strips, etc.

The side entry port insert can be configured as a single body element or can comprise several elements, such as for example a low friction guide, an insert and a hatch. Furthermore, t In the particular embodiment shown in the FIGS. 1-6 the top bearing ring 9 has a circumferential side wall 24, which side wall extends along the second row of axial load rollers 12 and guides these axial load rollers in a circumferential direction. According to the invention, the side wall 24 is provided with at least one side entry port 25 configured to allow access, in a lateral direction, to the second row of axial load rollers 12. In the particular embodiment shown, the side entry port is provided in the bottom section 23 of the top bearing ring 9.

FIGS. 8a-d show a perspective view of part of the slew bearing 7 in which the side entry port 25 is provided. The side entry port is provided in a semi-circular bottom section segment.

According to the invention, the side entry port 25 is provided with a removable insert 26. The removable insert 26 has a guide surface 27 that is part of the circumferential side wall 24 in which the entry port 25 is provided. The guide surface 27 of the insert is configured for guiding the axial load rollers of the second row of axial rollers 12 in the circumferential direction. Therefore, the insert is either provided with a surface fit for guiding the axial load rollers, or the roller bodies cages, or can be provided with guides, such as low friction strips, etc.

As is the case with the removable raceway segment according to the invention, a side entry port insert van be configured as a single body element or as can comprises several elements, such as for example a low friction guide, an insert and a hatch. Furthermore, as is the case with the removable raceway segment, the side entry port insert can be removed from the entry port it is provided in without the need of taking apart the bearing, more in particular without removing any segments, such as semi-circular mid-section segments or semi-circular bottom segments, that are part of the bearing.

Also, the side entry port is dimensioned such that, when the removable insert has been removed from the side entry port, via the side entry port axial load rollers or the roller bodies cages they are provided in, can be removed and replaced in a substantially lateral direction from the second row of axial load rollers.

The FIGS. 8a-d show the subsequent steps involved in removing a roller bodies cage 35 from the second row of rollers 12. In the embodiment shown, the side entry port insert is provided with vertical openings, which when the side entry port insert is correctly located in the side entry port are indexed with the vertical openings provided in the semi-circular segments for receiving the bolts to keep the bearing ring together. Thus, these bolts can be sued to secure the side entry port insert in the side entry port.

FIG. 8a shows the removable insert 26 releasable secured in the side entry port 25. In this condition, the removable insert guides the roller bodies cage bodies. In FIG. 8b the bolts that secured the side entry port insert in the side entry port have been removed to allow for the insert to be removed. In FIG. 8c the side entry port insert has been removed, which provided a view of the roller bodies cages of the first second row of roller bodied. It is also clear from FIG. 8c that the side entry port is dimensioned such that a roller bodies cage can be removed in a lateral direction from the bearing. FIG. 8d shows a roller bodies cage, which is provided with grip elements to facilitate engagement of the cage by hand, taken from the bearing.

In an alternative embodiment of a slew bearing according to the invention, the bottom bearing ring is provided with a circumferential side wall that extends along the second row of axial load rollers and guides these axial load rollers in a circumferential direction. In such an embodiment, the at least one side entry port can be provided in this side wall of the lower bearing ring to allow access, in a lateral direction, to the second row of axial load rollers.

The side entry port insert can be removed from the entry port it is provided in without the need of taking apart the bearing, more in particular without removing any components of the slew bearing, such as semi-circular mid-section segments or semi-circular bottom segments, that are part of the bearing.

Also, the side entry port is dimensioned such that, when the removable insert has been removed from the side entry port, via the side entry port axial load rollers or the roller bodies cages they are provided in, can be removed and replaced in a substantially lateral direction from the raceway.

The FIGS. 10a-10d show the subsequent steps involved in removing a roller bodies cage 135 from the raceway. In the embodiment shown, the side entry port insert is provided with vertical openings, which when the side entry port insert is correctly located in the side entry port are indexed with the vertical openings provided in the semi-circular segments for receiving the bolts to keep the bearing ring together. Thus, these bolts can be sued to secure the side entry port insert in the side entry port.

FIG. 10 a shows the removable insert 126 releasable secured in the side entry port 125. In this condition, the removable insert guides the roller bodies cage bodies. In FIG. 8b the bolts that secured the side entry port insert in the side entry port have been removed to allow for the insert to be removed. In FIG. 8c the side entry port insert has been removed, which provided a view of the roller bodies cages of the first second row of roller bodied. It is also clear from FIG. 8c that the side entry port is dimensioned such that a roller bodies cage can be removed in a lateral direction from the bearing. FIG. 8d shows a roller bodies cage, which is provided with grip elements to facilitate engagement of the cage by hand, taken from the bearing.

In an alternative embodiment of a slew bearing according to the invention, the stationary bearing ring is provided with a circumferential side wall that extends along the row of axial load rollers and guides these axial load rollers in a circumferential direction. In such an embodiment, the at least one side entry port can be provided in this side wall of the lower bearing ring to allow access, in a lateral direction, to the second row of axial load rollers.

Figure 11A:
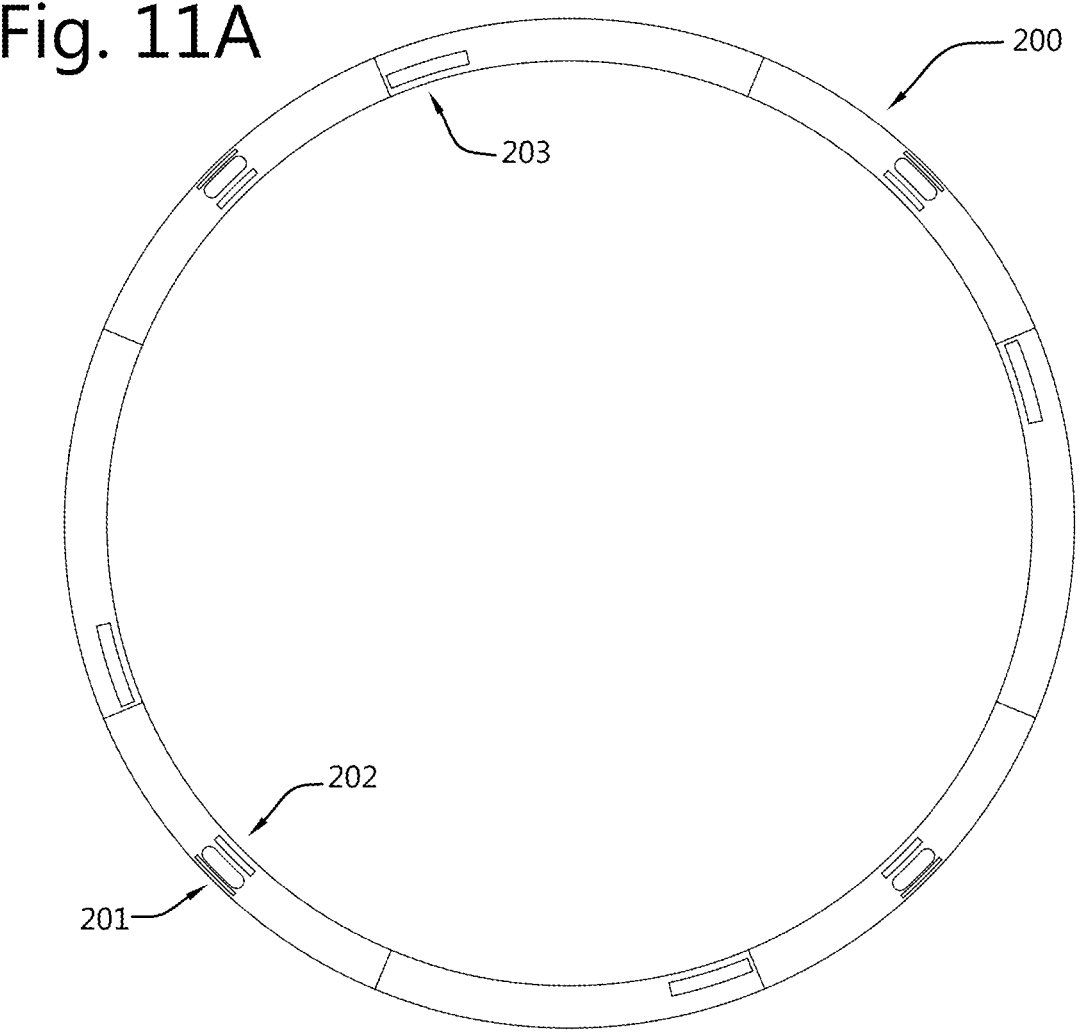
FIG. 11a-11c show a top view of a moveable bearing ring with multiple main components, each provided with entry ports, such a main component in isolation and a perspective view of such a mina component lifted in a raised maintenance position.
Figure 11B:
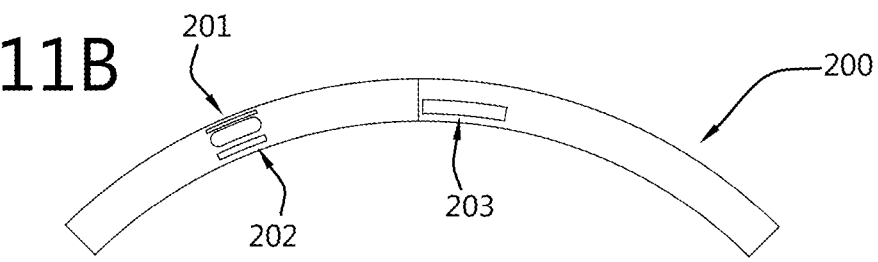
Figure 11C:
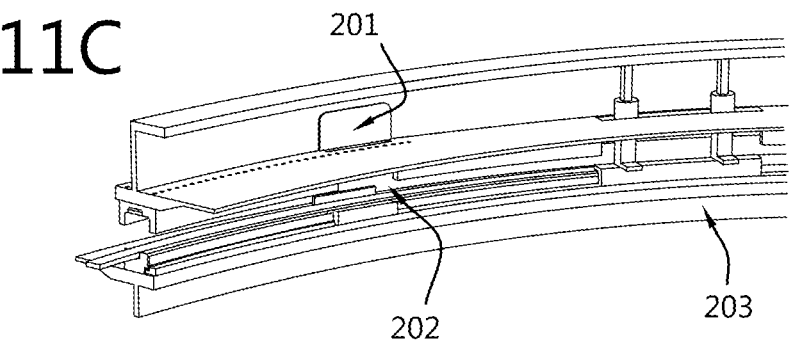

FIG. 11a shows a top view of a moveable bearing ring comprising multiple, in the embodiment shown four, main components 200. Each main component comprises a top entry port 201 and a side entry port 202. Furthermore, each main component is provided with an actuator device 203, in the form of two hydraulic cylinders, for lifting the main component. FIG. 11b shows a top view of a main component in isolation, and FIG. 11c shows a perspective view of the main component lifted into a maintenance position. It is submitted that the maintenance position shown in FIG. 11c is such that full access to the raceway is provided, and thus enables service to the raceways. For servicing the roller bodies cages, the mina component does not need to be lifted to such a height. For servicing the roller bodies cages the main component needs to be raised sufficiently for the top of the raceway to disengage the roller bodies, i.e. unload the rollers, such that the cages can be pushed around the raceway. Thus, the roller bodies cages can be pushed around the raceway and be serviced via the entry ports.

FIG. 12 and FIG. 13 show the main component of FIG. 11c in more detail in a operational position and in a maintenance position respectively.

Figure 14:
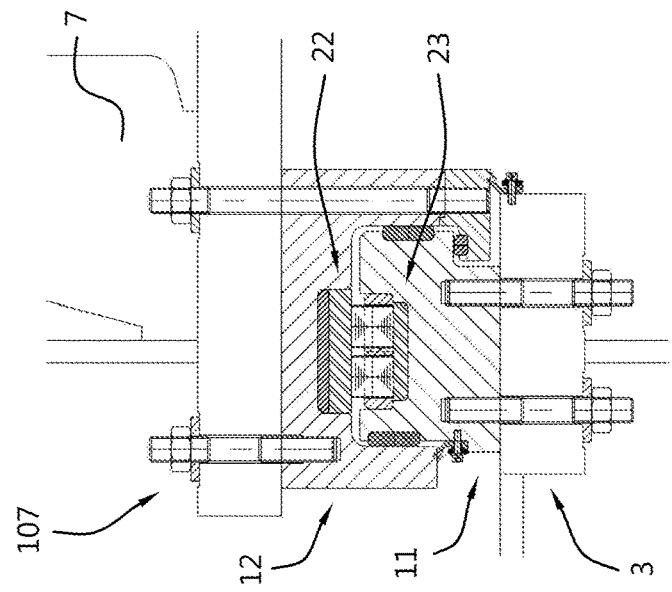
FIG. 14 shows a cross sectional view of a slew bearing according to the invention, at a location of the slew bearing ring where the moveable bearing ring comprises a main portion and an auxiliary portion.
Figure 15:
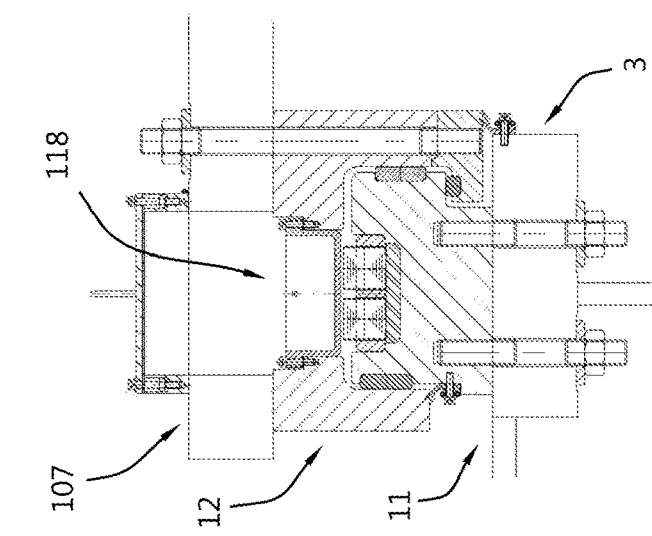
FIG. 15 shows a cross sectional view of the slew bearing of FIG. 14, at a location of the slew bearing ring where the moveable bearing ring comprises top entry port for providing access to a raceway.
Figure 16:
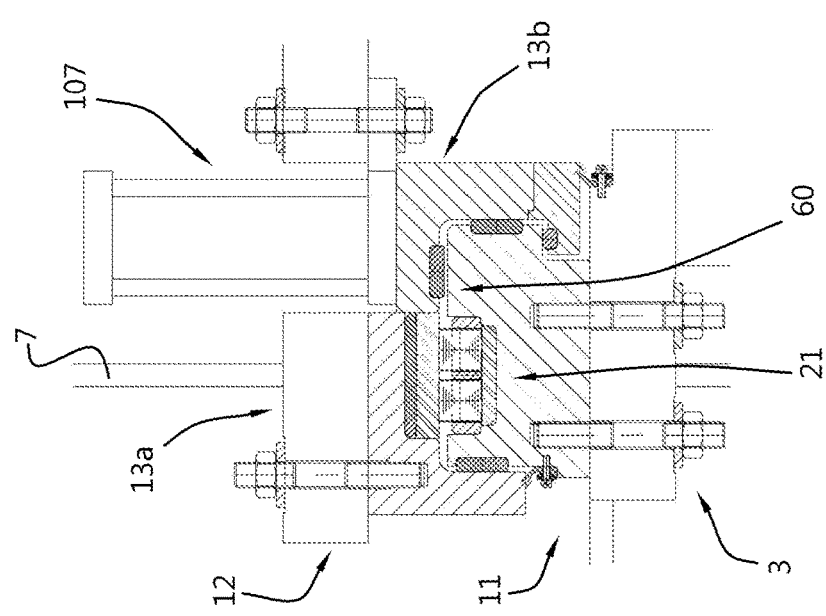
FIG. 16 shows a cross sectional view of the slew bearing of FIG. 14, at a further location of the slew bearing ring, i.e. a section without a lifting actuator or entry port.

FIGS. 14-16 show three cross sections of a slew bearing similar to the one shown in FIG. 11a, this slew bearing comprising only top entry ports and being provided with an alternative actuator. FIG. 14 shows a cross sectional view of the slew bearing ring where the moveable bearing ring comprises a main portion and an auxiliary portion. The figure also shows the actuator. FIG. 15 shows a cross sectional view of the slew bearing of FIG. 14 at a location of the slew bearing ring where the moveable bearing ring comprises a top entry port for providing access to a raceway. FIG. 16 shows a cross sectional view of the slew bearing of FIG. 14 at a further location of the slew bearing ring, i.e. at a location without a lifting actuator or entry port.

In an embodiment, the actuators are mounted on a skid platform that is mounted on a skid track, which allows for rotating the moveable bearing ring relative to the stationary bearing ring, while lifted by the actuators.

In an embodiment, the invention provides a slew bearing with multiple sections, e.g. four quarters, which sections are each provided with one or more top entry ports and/or one or more side entry ports and one or more actuators for lifting part of the moveable bearing ring, to enable servicing of the sections independently. Thus, each section, and the roller bodies cages located in that section, can be serviced while the other sections are in their working configuration, and thus transfer load from the moveable bearing ring to the stationary bearing ring.

FIG. 17a-17b show alternative top views of a first pushing device 300 according to the invention. The pushing device comprise tow pushing members 301, each in the form of a v-shaped arm, which pushing members are at one end pivotably secured to the baring and at the opposite end configured to push a roller bodies cage, and in the embodiment shown a pusher block 302. The pushing member 301 are connected via a hydraulic cylinder 303, which can be used to move the arms between a first and second position. FIG. 17b shows the pushing members in both the first and second position. FIG. 17 also shows the pusher blocks 302 in two positions. in a first pushing step, the pushing members engage a roller bodies cage directly. In a second subsequent pushing step, pusher blocks are used. By providing the pusher blocks 302, the pushing members do not need to enter the raceway on opposite sides of the entry port. Once the have pushed the pusher blocks, and thus a row of roller bodies cages, along a section of the raceway, the pusher blocks are removed and a new roller bodies cage is inserted. The newly inserted roller bodies cage is subsequently pushed along the raceway, in a first pushing step directly by a pushing member directly, and in a second pushing step via a pusher block.

The pushing device 300 shown in FIG. 17 is a double action pushing device, i.e. is configured to push roller bodies cages at opposite sides of the entry port 304. The slew bearing is provided with at least two other entry ports for removing roller bodies cages, pushed in front of the entry opening of those entry ports by the pushing device.

It is submitted that the pushing device 300 can also be configured in a single action pushing device, i.e. with a single pushing member to push roller bodies cages at one side of the entry port only.

Figure 18A:
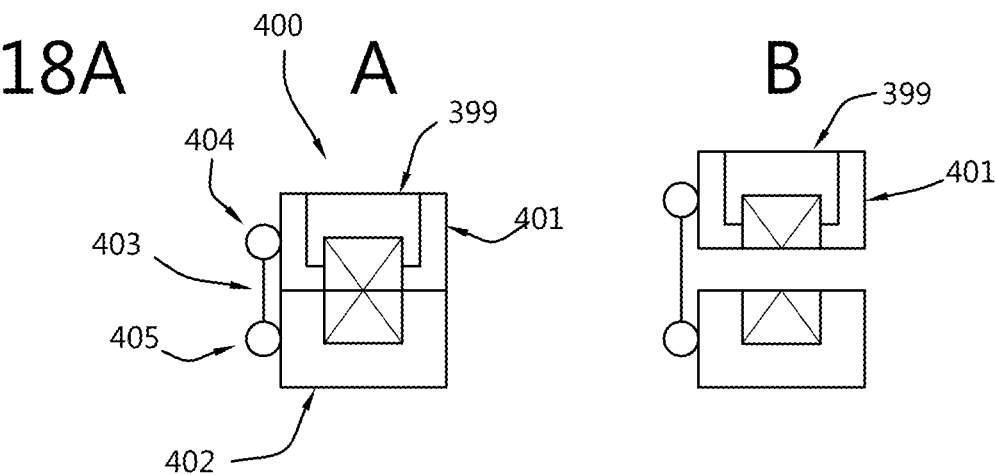
FIG. 18a-18c show a schematical view in cross section of alternative configurations of a slew bearing according to the invention.
Figure 18B:
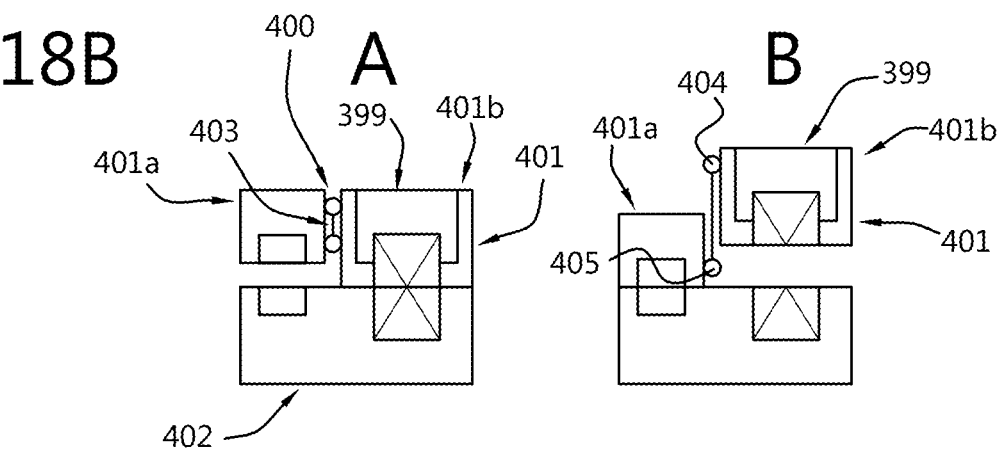
Figure 18C:
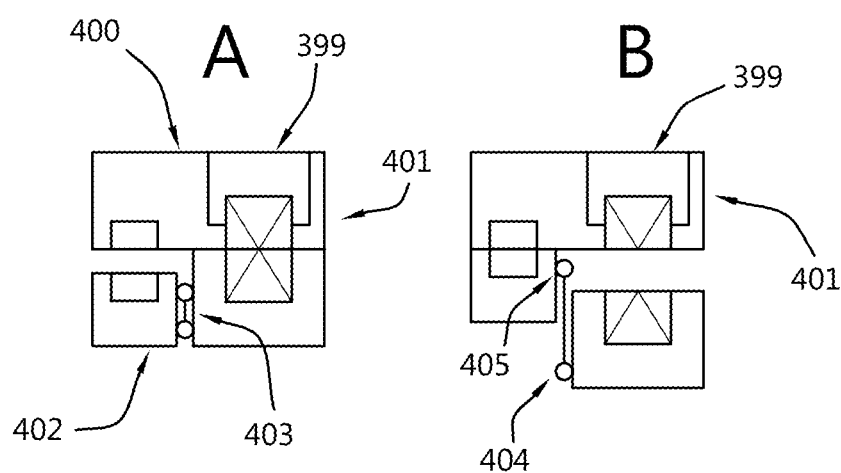

FIGS. 18*a*-18*c* show a schematical view in cross section of alternative configurations of a slew bearing 400 according to the invention wherein the moveable bearing ring 401 is provided with a top entry port 399.

FIGS. 18*a* A, 18*b* A and 18*c* A show the slew bearing 400 with the moveable bearing ring 401 in the operational position, and FIGS. 18*a* B, 18*b* B and 18*c* B show the slew bearing 400 with the moveable bearing ring in the maintenance position.

FIG. 18*a* shows a configuration wherein the slew bearing 400 comprises a moveable bearing ring 401 and a stationary bearing ring 402, and wherein an actuator 403 via a first seat section 404 is fixed to the stationary bearing ring and via a second seat section 405 is fixed to the moveable bearing ring, to enable the actuator 403 received in the actuator seats to move the main portions of the moveable bearing ring between the operational position and the maintenance position.

FIG. 18*b* shows a configuration wherein the slew bearing 400 comprises a moveable bearing ring 401 and a stationary bearing ring 402, wherein the moveable bearing ring comprises a main portion 401*a* and an auxiliary portions 401*b*. the auxiliary portion comprising upper low-friction pads 406 of an auxiliary bearing. The actuator 403 is via a first seat section 404 fixed to the auxiliary portion 401*a* of the moveable bearing ring and via a second seat section 405 to the main portion 401*b* of the moveable bearing ring, to enable the actuator 403 received in the actuator seats to move the main portion of the moveable bearing ring between the operational position and the maintenance position.

FIG. 18*c* shows a configuration wherein the slew bearing 400 comprises a moveable bearing ring 401 and a stationary bearing ring 402, wherein the stationary bearing ring comprises a main portion 402*a* and an auxiliary portions 402*b*. The auxiliary portion 402*b* comprising lower low-friction pads 406 of an auxiliary bearing. The actuator 403 is via a first seat section 404 fixed to the auxiliary portion 402*a* of the stationary bearing ring and via a second seat section 405 to the main portion 402*b* of the stationary bearing ring, to enable the actuator 403 received in the actuator seats to move the main portion of the moveable bearing ring between the operational position and the maintenance position by pushing the auxiliary portion 402*a* upwards relative to the main portion 402*b*, and thus lifting the moveable bearing ring, or, in an alternative configuration, by lowering the main portion 402*a* relative to the auxiliary portion 402*b*.

FIG. 19 is a side view of a vessel 1001 comprising a hoisting crane 1020 comprising a bearing structure 1025 according to the third aspect of the invention. The vessel 1001 has a hull 1002 with a working deck 1003 and, at the front of the hull 1002, a superstructure 1004 for crew accommodation, etc. The vessel 1001 has a hoisting crane 1020, disposed at the rear side of the vessel 1001, which hoisting crane 1020 has a vertical structure fixed to the hull 1002. The hoisting crane 1020 will be described in more detail below.

The hoisting crane 1020, which is illustrated in detail in FIG. 20, has a substantially hollow vertical column 1021 with a foot 1022, which in this case is fixed to the hull 1002 of the vessel 1001. Alternatively, the foot 1022 of the crane 1020 can be fixed to any other support, e.g. a quay on the mainland. Furthermore, the column 1021 has a top 1023. Between the foot 1022 and the top 1023, the column 1021 has a body 1021*a*. Furthermore the hoisting crane 1020 comprises a jib 1024.

An annular bearing structure 1025 extends around the vertical column 1021 and guides and carries a jib connection member 1028, so that the jib connection member 1028, and therefore the jib 1024, can rotate about the column 1021. The annular bearing structure will be discussed in more detail below. In this case, the jib 1024 is connected pivotably to the jib connection member 1028 via a substantially horizontal pivot axis 1045, so that the jib 1024 can also be pivoted up and down. There is at least one drive motor 1027 for displacing the jib connection member 1028 along the annular bearing structure 1025.

To pivot the jib 1024 up and down, there is a topping winch 1030 provided with a topping cable 1031 which engages on the jib 1024.

Furthermore, the hoisting crane 1020 comprises a hoisting winch 1035 for raising and lowering a load, with an associated hoisting cable 1036 and a hoisting hook 1037. At the top 1023 of the column 1021 there is a top cable guide 1040 provided with a cable pulley assembly 1041 for the topping cable 1031 and with a second cable pulley assembly 1042 for the hoisting cable 1036.

One or more third cable pulley assemblies 1043 for the hoisting cable 1036 and a fourth cable pulley assembly 1044 for the topping cable 1031 are arranged on the jib 1024. The number of cable parts for each cable can be selected as appropriate by the person skilled in the art.

The winches 1030 and 1035 are in this case disposed in the foot 1022 of the vertical column 1021, so that the topping cable 1031 and the hoisting cable 1036 extend from the associated winch 1030, 1035 upward, through the hollow vertical column 1021 to the top cable guide 1040 and then towards the cable guides 1043, 1044 on the jib 1024.

The top cable guide 1040 has a rotary bearing structure, for example with one or more running tracks around the top of the column 1021 and running wheels, engaging on the running tracks, of a structural part on which the cable pulley assemblies are mounted. As a result, the top cable guide can follow rotary movements of the jib about the vertical column 1021 and adopt substantially the same angular position as the jib 1024.

The top cable guide 1040 may have an associated drive motor assembly which ensures that the top cable guide 1040 follows the rotary movements of the jib 1024 about the column 1021, but an embodiment without drive motor assembly is preferred.

The winches 1031 and 1035 are in this embodiment arranged on a movable winch support 1038, which is mounted movably with respect to the vertical column 1021. The winch support 1038 here is located in the vertical crane structure, preferably in the region of the foot 1022 under the circular cross section part of the column 1021, and is mechanically decoupled from the top cable guide 1040. The support 1038 could e. g. also be arranged in the hull of the vessel below the column, e. g. the foot could have an extension which extends into the hull.

FIG. 21 shows a top view of a part of an annular bearing assembly according to the third aspect of the invention. The bearing assembly has a bearing centre (not shown) which is the centre point of the concentric circles visible in FIG. 21. The bearing assembly comprises an lower ring 1101 and an upper ring (not shown). The lower ring 1101 is located on the inside of the circle formed by the annular bearing assembly, and is in the shown application connected to the column 1021. The upper ring is connected the jib connection member 1028, and further provided with a plurality of teeth 1121. The teeth 1121 are adapted to be engaged by a rotatable driving gear 1201, of which in FIG. 21 two are shown. The driving gear 1201 are driven by a motor (not shown). By rotating the driving gear 1201, rotating of the upper ring relative to the lower ring 1101 and thus of the jib connection member 1028 relative to the column 1021 can be achieved. There is further provided a bearing assembly support structure 1130, which supports the bearing assembly. The bearing support structure 1130 is widened on the location of the driving gear 1201, such that the driving gear 1201 can also be supported by the bearing support structure 1130. In alternative embodiments, the driving gear 1201 can also be arranged on the inside of the annular bearing assembly.

FIG. 22 shows a cross-section of the annular bearing assembly in an assembled state. The annular bearing assembly comprises the lower ring 1101, which is the assembled state is attached to the column 1021. The annular bearing assembly further comprises the upper ring which comprises of a first upper ring part 1102. As can be seen, the lower ring 1101 has a protruding mating part 1101a, which fits into a hollow mating part 1102a of the upper ring part 1102. The protruding mating part 1101a comprises an inner surface 1101c, an outer surface 1101d and a top surface 1101b. Furthermore, in the shown example the hollow mating part 1102a has a U-shaped form, which U in assembled state is in fact an upside-down or inverted U. The hollow mating part 1102a has an inner leg 1102c, an outer leg 1102d and a horizontal leg 1102b. The upper ring further comprises a second upper ring part 1103, which is attached to a bottom surface the outer leg 1102d the first upper ring part 1102. The second upper ring part 1103 extends partially below the protruding mating part 1101a of the lower ring 1101, such that an upper surface 1103e of the second upper ring part 1103 faces a lower surface 1101e of the protruding mating part 1101a of the lower ring 1101.

In the context of this third aspect of the invention, terms as "inner" and "inwards" are meant to mean closer to the bearing centre in the horizontal plane, while terms as "outer" and "outwards" are meant to mean further away from the bearing centre in the horizontal plane. Terms as "top", "above" and "higher" on the one hand, and "bottom", "under" and "lower" are meant to be interpreted in the conventional meaning, i.e. seen in vertical direction. In FIG. 22, inwards is to the left, and higher is to the top.

The annular bearing assembly according to the third aspect of the invention, when seen in a cross-section as in FIG. 22, is provided with exactly four components 1110, 1111, 1112, 1113 that guide the movement of the first upper ring part 1102 and the second upper ring part 1103, relative to the lower ring 1101. Those four components consist of one roller 1110, and three slide pads 1111, 1112, 1113, 1114.

As can be seen, the protruding mating part 1101a of the lower ring 1101 comprises a groove 1211 at the top surface 1101b. This is shown in more detail in FIG. 23a. In the groove 1211, there is a cage 1210 provided. The cage 1210 is arranged to receive the roller 1110, which in turn supports the upper ring and associated structures. The roller 1110 absorbs the vertical downward forces.

FIG. 23b illustrates a top view of the cages 1210. As can be seen, the cages 1210 are arranged in circumferentially in series. The bearing assembly comprises plurality of cages 1210, which each in turn comprise a plurality of rollers 1110, in this case six rollers 1110 in each cage. The rollers 1210 are also arranged circumferentially in series. The rollers 1110 are thus arranged in series when seen in a direction following the annular form of the bearing assembly. In other words, the centre of each roller 1110 is located substantially on the same distance of the bearing centre. As is further visible in FIG. 23a, it is possible to arrange a some subsequent cages 1210 directly in contact with each other, while maintain a gap between other subsequent cages 1210.

For example, the distance of the centre of the rollers to the bearing centre may be 3687 mm, and the bearing assembly may be provided with 78 cages 1210, resulting in 468 rollers 1110. This results in a distribution of the vertical forces over said rollers 1110, and thus over the bearing assembly.

Preferably, each cage 1210 comprises at least four, five, six or seven rollers 1110. Preferably, the bearing assembly comprises at least fifty cages 1210.

Referring back to FIG. 23a, wherein it is shown that optionally a raceway 202 of horizontal leg 1102b of the hollow mating part of the first upper ring part 1102 which is located above the rollers 1110 is manufactured in another metal than the rest of the first upper ring part 1102. The raceway 1202 is made from a metal that is suitable for contact with the rollers 1110 and movement relative to the rollers 1110. For example, the raceway 202 can be made from hardened steel or the material commercially available under the trademark HARDNOX.

Further optionally, a part 1201 of horizontal leg 1102b of the hollow mating part of the first upper ring part 1102 which is located above the rollers 1110 is manufactured in a material, e.g. plastic, that is more elastically deformable than the rest of the first upper ring part 1102. This gives a small degree of elastic support to the upper ring 1102 and the associated components. Optionally, the material of said part 1201 is the same material as used for the slide pads 1111, 1112, 1113. Optionally, said material is the material commercially available under the trademark ORKOT.

The part 1203 below the groove 1211 is preferably made in a strong material, e.g. a strong metal, to minimize elastic deformation thereof due to the vertical forces, since such deformation would lead to suboptimal interaction of the lower ring and the upper ring, i.e. more friction. The part 1203 is optionally made from hardened steel or HARDNOX.

Referring now back to FIG. 22, the first slide pad 1113 of said three slide pads is arranged on, i.e. comprised by, the upper surface 1103e of the second upper ring part 1103. It is thus arranged to enable sliding of the upper surface 1103e of the second upper ring part 1103 relative to the lower surface 1101e of the protruding mating part 1101a of the lower ring 1101. The first slide pad 1113 is, when the annular bearing assembly is assembled, located below the roller 1110, and radially outwards from the roller 1110. That is, at least the centre of the first slide pad 1113 is arranged radially outwards from a centre of the roller 1110. The first slide pad 1113 is exposed to vertical upward forces; however, these are considerably lower than the vertical forces to which the roller 1110 is exposed. The first slide pad 1113 thus prevents the upper ring from getting disconnected from the lower ring 1101 when upwards forces are present, e.g. because of tilting of the jib connection member.

The second slide pad 1111 of said three slide pads is arranged on, i.e. comprised by, the inner leg 1102c of the first upper ring part 1102. It is thus arranged to enable sliding between the inner leg 1102c of the first upper ring part 1102 and the inner surface 1101c of the protruding mating part 1101a of the lower ring 1101. As can be seen in FIG. 22, the second slide pad 1111 is arranged below the roller 1110, and radially inwards from the roller 1110. Furthermore, the second slide pad 1111 is arranged above the first slide pad 1113, and radially inwards from the first slide pad 1113. The second slide pad 1111 is exposed to horizontal forces.

The third slide pad 1112 of said three slide pads is arranged on, i.e. comprised by, the outer leg 1102*d* of the first upper ring part 1102. It is thus arranged to enable sliding between the outer leg 1102*d* of the first upper ring part 1102 and the outer surface 1101*d* of the protruding mating part 1101*a* of the lower ring 1101. As can be seen in FIG. 22, the third slide pad 1112 is arranged below the roller 1110, and radially outwards from the roller 1110. It is thus also arranged radially outwards from the second slide pad 1111. Furthermore, the third slide pad 1112 is arranged above the first slide pad 1113, and radially outwards from the first slide pad 1113.

The roller 1110 and the first slide pad 1113 are arranged such that the absorb the vertical forces. However, the roller 1110 carries the vast majority of those vertical forces, since the upper ring is supported on the rollers 1110, which as such carry the weight of the jib as well. In normal operations, the vertical upward forces should be limited or non-existing. The second slide pad 1111 and the third slide pad 1112 are engaged by radial forces. Preferably, as is in the shown example, the roller 1110 is located substantially in the centre of protruding mating part 1101*a* when seen in the radial or horizontal direction.

The arrangement of the annular bearing assembly according to the third aspect of the invention has proven to result in an improved distribution of the forces over the component of the bearing assembly, including the roller 1110 and the slide pads 1111, 1112, 1113. This results in more stability, as well as leas wear and fatigue of the components.

It should further be noted that is advantageous to arrange the sliding pads 1111, 1112, 1113 in or on the upper ring, such that no recesses must be made in the lower ring 1101 for such arrangements. As such, the lower ring 1101 is maintained as strong and robust as possible, which is advantageous considering the large vertical forces that must be carried by the lower ring 1101.

As is clearly visible in FIG. 22, in a cross section as shown in FIG. 22 the bearing assembly comprises exactly one roller 1110, one slide pad 1113 exposed to vertical forces, and two slide pads 1111, 1112 exposed to horizontal forces. As is already explained with reference to FIGS. 23*a*-23*b*, the bearing assembly in practice comprises a plurality of rollers 1110. Similarly, it is possible that each for one or more of the slide pads 1111, 1112, 1113 in practice multiple slide pads are provided. That is, over the circle that each of these slide pads 1111, 1112, 1113 forms in the annular bearing assembly, it is possible that said slide pad is formed by multiple slide pads, each covering a part of the circle. This may be easier in construction and maintenance. Furthermore, it is possible that on small parts of said circle no sliding pad is provided, because of practical considerations.

The bearing assembly according to the third aspect of the invention can be used for applications such a hoisting crane, and is thus relatively large. The diameter of the bearing assembly may for example be at least 5 m.

Furthermore shown in FIG. 22, is a temperature sensor 1104. The temperature sensor 1104 is adapted to measure the temperature of at least a part of the bearing assembly. When the temperature becomes too high, the slide pads 1111, 1112, 1113 may be damaged. Therefore, the temperature sensor 1104 is connected to a system that is adapted to stop the use of the bearing assembly when the temperature rises too high, or it is at least connected to a system which is adapted to indicate such a situation to an operator.

Furthermore shown in FIG. 22 are seals 1301 and 1302. These seals 1301, 1302 are arranged to prevent liquid, e.g. lubricant such as oil-based lubricants, from leaking.

FIG. 24 illustrates a method according to the third aspect of the invention that can be applied to assemble a bearing assembly according to the third aspect of the invention. To assemble the bearing assembly according to the third aspect of the invention, the upper ring should be arranged on the lower ring 1101 such that the hollow mating part 1102*a* of the first upper ring part 1102 receives the protruding mating part 1101*a* of the lower ring 1101. However, since the second upper ring part 1103 in assembled position extends below the lower ring 1101, it is not possible to arrange the upper ring while the first upper ring part 1102 and the second upper ring part 1102 attached to each other. Furthermore, it should be avoided as much as possible that metal of the lower ring 1101 and metal of the upper ring are in contact with each other during such arrangement, since this would result in scraping and damaging of the components.

Considering the above, it is envisaged by the inventors to attach a guide block 1301 on the bottom surface of the outer leg 1102*d* of the first upper ring part 1102. The guide block 1301 guides the arrangement of the first upper ring part 1102 onto the lower ring 1101.

After the arrangement of the first upper ring part 1102 on the lower ring 1101, the guide block 1301 is detached from the first upper ring part 1102, and the second upper ring part 1103 is attached thereon.

In a possible embodiment, the second upper ring part 1103 is arranged below the lower surface 1101*e* of the protruding mating part 1101*a* of the lower ring 1101 prior to the arrangement of the first upper ring part 1102 on the lower ring 1101. After said arrangement, the second upper ring part 1103 is arranged against the first upper ring part 1102 and attached thereto.

In a possible embodiment, the second upper ring part 1103 consists of two half-annular parts, which together form the annular form of the second upper ring part 1103. That is, the two parts each form a part of said annulus. It is then possible to first arrange the first upper ring part 1102 on the lower ring 1101, and thereafter slide each of the two half-annular parts from the side under the first upper ring part 1102, and then attach them thereto.

The invention claimed is:

1. A slew bearing, the slew bearing comprising:
a stationary bearing ring to be fixed to a base;
a moveable bearing ring to be fixed to a moveable object, the moveable bearing ring being concentric with the stationary bearing ring; and
an upper main axial bearing for enabling rotation of the moveable bearing ring relative to the stationary bearing ring about a rotation axis, the upper main axial bearing having a row of axial load rollers, the axial load rollers being arranged between a top roller raceway and a bottom roller raceway, the top roller raceway being connected to the moveable bearing ring and the bottom roller raceway being connected to the stationary bearing ring, and the axial load rollers configured to transfer axial loads parallel to the rotation axis between the moveable bearing ring and the stationary bearing ring,
wherein the moveable bearing ring comprises one or more main portions with at least a part of the top roller raceway of the upper main axial bearing and the stationary bearing ring comprises one or more main portions with at least a part of the bottom roller raceway of the upper main axial bearing, wherein the one or more main portions of the moveable bearing ring are moveable relative to the one or more main portions of the stationary bearing ring between:

an operational position, in which the at least part of the top roller raceway engages with the axial load rollers to transfer the axial loads between the moveable bearing ring and the stationary ring; and a raised maintenance position, in which the at least part of the top roller raceway is disengaged from the axial load rollers, wherein the slew bearing is provided with multiple actuator seats, each seat comprising a first seat section and a second seat section, the actuator seats being configured for receiving an actuator between the first seat section and the second seat section, to enable actuators received in the actuator seats to move the one or more main portions of the moveable bearing ring between the operational position and the raised maintenance position, wherein the moveable bearing ring is provided with one or more top entry ports, the one or more top entry ports are provided in a top wall of the one or more main portions of the moveable bearing ring, and/or one or more side entry ports, the one or more side entry ports being provided in a side wall of the one or more main portions of the moveable bearing ring, and/or wherein the stationary bearing ring is provided with one or more side entry ports, the one or more side entry ports being provided in a side wall of the one or more main portions of the stationary bearing ring, and wherein the one or more top entry ports and/or one or more side entry ports providing access to the upper main axial bearing when the main portions are in the raised maintenance position and are dimensioned to enable inspection of the axial load rollers of the main bearing via the one or more top entry ports and/or the one or more side entry ports.

2. The slew bearing according to claim 1, wherein actuators are provided in the actuator seats, the actuators being configured to move the one or more main portions of the moveable bearing ring over a limited distance between the operational position and the raised maintenance position.

3. The slew bearing according to claim 2, wherein the distance is smaller than a diameter of the axial load rollers.

4. The slew bearing according to claim 1, wherein the first seat section is fixed to the stationary bearing ring and the second seat section is fixed to the moveable bearing ring, to enable the actuators, when received in the actuator seats, to move the one or more main portions of the moveable bearing ring between the operational position and the raised maintenance position.

5. The slew bearing according to claim 1, wherein the slew bearing comprises an upper auxiliary axial bearing having upper low-friction pads arranged on the moveable bearing ring and corresponding lower low-friction pads arranged on the stationary bearing ring to, when at least one of the main portions of the moveable bearing ring is in the raised maintenance position, engage with the upper low-friction pads, in order to transfer the axial loads parallel to the rotation axis between the moveable bearing ring and the stationary bearing ring when the upper and lower low-friction pads engage with each other.

6. The slew bearing according to claim 5, wherein the moveable bearing ring comprises one or more auxiliary portions each auxiliary portion comprising at least a part of the upper low-friction pads, and wherein the first seat sections are each fixed to one of the one or more auxiliary portions of the moveable bearing ring, and the second seat sections are each fixed to one of the one or more main portions of the moveable bearing ring, to enable the actuators, when received in the actuator seats, to move the one or more main portions of the moveable bearing ring relative to auxiliary portions of the moveable bearing ring, and thus move the main portions of the moveable bearing ring between the operational position and the raised maintenance position.

7. The slew bearing according to claim 5, wherein the stationary bearing ring comprises one or more auxiliary portions each auxiliary portion comprising at least a part of the lower low-friction pads, and wherein the first seat sections are each fixed to one of the one or more auxiliary portions of the stationary bearing ring, and the second seat sections are each fixed to one of the one or more main portions of the stationary bearing ring, to enable the actuators, when received in the actuator seats, to move the one or more main portions of the stationary bearing ring relative to auxiliary portions of the stationary bearing ring, and thus move the main portions of the moveable bearing ring between the operational position and the raised maintenance position.

8. The slew bearing according to claim 1, wherein the moveable bearing ring and/or the stationary bearing ring comprises one or more auxiliary portions, wherein the one or more main portions of the moveable bearing ring and/or the stationary bearing ring are respectively movable relative to the auxiliary portions of the moveable bearing ring and/or the stationary bearing ring, and the main portions and the auxiliary portions are configured to be temporarily fixed to each other when the one or more main portions of the moveable bearing ring is in the raised maintenance position or the operational position, such that the actuators, when received in the actuator seats, do not need to actively support the one or more main portions or the one or more auxiliary portions.

9. A slew bearing comprising:

a stationary bearing ring to be fixed to a base; and a moveable bearing ring to be fixed to a moveable object, the moveable bearing ring being concentric with the stationary bearing ring, wherein the stationary bearing ring and the moveable bearing ring are configured to enable rotation of the moveable bearing ring relative to the stationary bearing ring about a rotation axis, wherein the slew bearing further comprises an upper main axial bearing having a row of axial load rollers, the axial load rollers being arranged between a top roller raceway and a bottom roller raceway, said top roller raceway being connected to the moveable bearing ring and said bottom roller raceway being connected to the stationary bearing ring, and said axial load rollers configured to transfer axial loads parallel to the rotation axis between the moveable bearing ring and the stationary bearing ring, wherein the slew bearing further comprises an upper auxiliary axial bearing having upper low-friction pads arranged on the moveable bearing ring and corresponding lower low-friction pads arranged on the stationary bearing ring to engage with the upper low-friction pads, wherein the upper low-friction pads are arranged parallel to the top roller raceway, and the lower low-friction pads are arranged parallel to the bottom roller raceway in order to transfer the axial loads parallel to the rotation axis between the moveable bearing ring and the stationary bearing ring when the upper low-friction pads and the lower low-friction pads engage with each other, wherein the moveable bearing ring comprises one or more main portions with at least a part of the top roller raceway of the upper main axial bearing and one or more corresponding auxiliary portions, each auxiliary portion comprising at least a part of the upper low-friction pads, wherein the one or more main portions are moveable relative to the corresponding one or more auxiliary portions between an operational position, in which the at least part of the top roller raceway engages with the axial load rollers to transfer the axial loads between the moveable bearing ring and the stationary ring, and a raised maintenance position, in which the at least part of the top roller raceway is disengaged from the axial load rollers, and wherein the one or more auxiliary portions are configured such that the at least part of the upper low-friction pads are engageable with the lower low-friction pads when the corresponding one or more main portions are in the raised maintenance position to transfer the axial loads between the moveable bearing ring and the stationary ring.

10. The slew bearing according to claim 9, wherein the slew bearing is provided with one or more top entry ports and/or one or more side entry ports to provide access to the axial load rollers of the upper main axial bearing.

11. The slew bearing according to claim 1, wherein at least one main portion of the movable bearing ring has a top wall, which top wall extends above the row of axial load rollers and in which top wall at least one top entry port is provided to allow access, from above, to the row of axial load rollers.

12. A system comprising a slew bearing according to claim 1, and an axial load rollers pushing device configured to, via an entry port, engage and move the axial load rollers along the bearing, and thus along the entry port, to position different axial load rollers at an entry port for inspection and/or servicing and/or replacement.

13. A hoisting crane comprising:
a crane structure;
a slew platform supporting the crane structure;
a base; and
the slew bearing according to claim 1, wherein the slew bearing is arranged between the base and the slew platform, the stationary bearing ring being fixed to the base and the moveable bearing ring being fixed to the slew platform, thereby allowing the crane structure to rotate relative to the base about the rotation axis.

14. The hoisting crane according to claim 13, wherein the one or more main portions and the one or more auxiliary portions are fixed to the slew platform, wherein the one or more auxiliary portions are releasably connected from the slew platform, wherein an actuator device, comprising multiple actuators, is provided between auxiliary portions and the slew platform and, with the actuators in the actuator seats, to lift the slew platform including the one or more main portions when the one or more auxiliary portions are disconnected from the slew platform thereby allowing to move the one or more main portions between the operational position and the raised maintenance position.

15. A vessel comprising:
a hull provided with an opening extending vertically through the hull;
a turret extending in the opening of the hull; and
the slew bearing according to claim 1, wherein the slew bearing is arranged between the hull and the turret, the stationary bearing ring being fixed to the hull and the moveable bearing ring being fixed to the turret, thereby allowing the turret to rotate relative to the hull about the rotation axis.

16. The vessel according to claim 15, wherein the one or more main portions and the one or more auxiliary portions are fixed to the turret, wherein the one or more auxiliary portions are releasably connected from the turret, wherein an actuator device, comprising multiple actuators, is provided between auxiliary portions and the slew platform and, with the actuators in the actuator seats, to lift the slew platform including the one or more main portions when the one or more auxiliary portions are disconnected from the slew platform thereby allowing to move the one or more main portions between the operational position and the raised maintenance position.

17. A method for performing inspection and/or maintenance of the slew bearing according to claim 1, the method comprising the steps:
a) mounting the actuators in the actuator seats if not already present;
b) using the actuators that are received in the actuator seats to raise the one or more main portions into the maintenance position; and
c) inspecting, and optionally removing and/or replacing, the axial load rollers via a top entry port or via a side port of the one or more main portions of the moveable bearing ring moved in the maintenance position or via the side entry port of the stationary bearing ring.

18. A method for replacing axial load rollers of the slew bearing according to claim 1, the method comprising the steps:
a) raising the one or more main portions of the moveable bearing ring into the raised maintenance position;
b) removing one or more of the axial load rollers from the upper main axial bearing via the top entry port or the side entry port of the moveable bearing ring or via the side entry port of the stationary bearing ring;
c) replacing one or more of the axial load rollers in the upper main axial bearing via the top entry port or the side entry port of the moveable bearing ring or via the side entry port of the stationary bearing ring;
d) optionally: using an axial load rollers pushing device configured to, via the top entry port or the side entry port of the moveable bearing ring or via the side entry port of the stationary bearing ring, engage and move the axial load rollers along the upper main axial bearing, and thus along the top entry port or the side entry port of the moveable bearing ring or via the side entry port of the stationary bearing ring, to position different axial load rollers at the top entry port or the side entry port of the moveable bearing ring or via the side entry port of the stationary bearing ring for inspection and/or servicing and/or replacement;
e) optionally: repeating steps b, c, and d; and
f) lowering the one or more main portions of the moveable bearing ring from the raised maintenance position back into the operational position.

19. A method for replacing axial load rollers of the slew bearing according claim 1, the method comprising the steps:

a) moving one or more main portions of the moveable bearing ring in the raised maintenance position and to provide access to the axial load rollers of the upper main axial bearing;
b) removing one or more axial load rollers from the upper main axial bearing via the top entry port;
c) replacing one or more axial load rollers in the upper main axial bearing via the top entry port;
d) optionally: using an axial load rollers pushing device configured to, via an entry port, engage and move the axial load rollers along the bearing, and thus along the top entry port, to position different axial load rollers at the top entry port for inspection and/or servicing and/or replacement;
e) optionally: repeating steps b, c, and d; and
f) replacing and attaching the removable top roller raceway segment in the top entry port and moving the one or more main portions of the moveable bearing ring back into the operational position.

20. An annular bearing assembly with a bearing centre, the bearing assembly comprising:
a lower ring, the lower ring comprising a protruding mating part comprising an inner surface, an outer surface and a top surface, wherein in the top surface a groove is present in which a circumferential series of cages is arranged, wherein each cage accommodates at least one array of rollers spaced apart circumferentially from one another;
an upper ring, the upper ring comprising:
a first upper ring part comprising an inverted U-shaped hollow mating part with an inner leg, an outer leg and a horizontal leg, wherein the hollow mating part is adapted to receive the protruding mating part of the lower ring such that the horizontal leg of the hollow mating part is in contact with the rollers and upper ring is vertically supported by the rollers, the rollers absorbing vertical forces; and
a second upper ring part, arranged against a bottom surface of one of the outer leg and the inner leg of the hollow mating part of the first upper ring part, the second upper ring part horizontally protruding below the protruding mating part of the lower ring, such that an upper surface of the second upper ring part partially faces a lower surface of the protruding mating part of the lower ring,
wherein the bearing assembly further has, when seen in a cross-section, exactly three slide pads, consisting of:
a first slide pad of said three slide pads, arranged to enable sliding between the upper surface of second upper ring part and the lower surface of the protruding mating part of the lower ring that the upper surface of the second upper ring part faces, the first slide pad absorbing any vertical upwards forces, wherein the first slide pad is arranged lower than the rollers in said cross-section, and a centre of the first slide pad is arranged horizontally offset from a centre of said rollers;
a second slide pad of said three slide pads, arranged to enable sliding between the inner surface of the protruding mating part of the lower ring and the inner leg of the hollow mating part of the first upper ring part, the second slide pad thereby absorbing horizontal forces, wherein second slide pad is arranged lower than the rollers in said cross-section, and horizontally offset, and above the first slide pad;
a third slide pad of said three slide pads, arranged to enable sliding between the outer surface of the protruding mating part of the lower ring and the outer leg of the hollow mating part of the first upper ring part, the third slide pad thereby absorbing horizontal forces, wherein the third slide pad is arranged lower than the rollers in said cross-section, and horizontally offset, and above the first slide pad.

21. The bearing assembly according to claim 20, wherein the second upper ring part comprises the first slide pad, and/or the first upper ring part comprises the second slide pad in the inner leg of the hollow mating part, and/or the first upper ring comprises the third slide pad in the outer leg of the hollow mating part.

22. A hoisting crane, comprising:
a column;
a jib;
a jib connection member disposed on the column and to which the jib is connected pivotably; and
the bearing assembly according to claim 20, wherein the lower ring is connected to the column, and the upper ring is connected to the jib connection member.

23. A method for assembling the bearing assembly according to claim 20, wherein the method comprises the steps of:
attaching a guide block on the bottom surface of the outer leg of the hollow mating part of the first upper ring par;
arranging the first upper ring part on the lower ring, such that the protruding mating part of the lower ring is arranged in the hollow mating part of the first upper ring part, and the first upper ring part is supported by the rollers;
detaching the guide block from the first upper ring part; and
attaching the second upper ring part on the bottom surface of the outer leg of the hollow mating part of the first upper ring part.

* * * * *